United States Patent [19]

Kitamura et al.

[11] Patent Number: 5,650,885
[45] Date of Patent: Jul. 22, 1997

[54] DEVICE HAVING SYNCHRONIZED SPINDLE CONTROL IN DISK DRIVES WITH AT LEAST TWO DATA PER ROTATION OF A DISK

[75] Inventors: Yoshiji Kitamura; Hirofumi Takiue, both of Tokyo, Japan

[73] Assignee: NEC Corporation, Tokyo, Japan

[21] Appl. No.: 470,460

[22] Filed: Jun. 6, 1995

Related U.S. Application Data

[62] Division of Ser. No. 359,847, Dec. 20, 1994, Pat. No. 5,555,140, which is a continuation of Ser. No. 976,408, Nov. 13, 1992, abandoned.

[30] Foreign Application Priority Data

| Nov. 18, 1991 | [JP] | Japan | 3-302147 |
| Jun. 4, 1992 | [JP] | Japan | 4-143892 |
| Nov. 13, 1994 | [JP] | Japan | 6-325367 |

[51] Int. Cl.$^6$ ............................................. G11B 27/19
[52] U.S. Cl. ............................ 360/73.02; 360/73.03
[58] Field of Search .......................... 360/73.02, 73.03

[56] References Cited

U.S. PATENT DOCUMENTS

| 4,618,897 | 10/1986 | Johnson et al. | 360/15 |
| 4,890,045 | 12/1989 | Ishizuka . | |
| 4,907,105 | 3/1990 | Kurzweil . | |
| 4,918,544 | 4/1990 | Ishizuka et al. | 360/73.03 |
| 5,159,503 | 10/1992 | Mitamura et al. | 360/73.02 |
| 5,216,654 | 6/1993 | Itoh et al. | 360/73.02 |
| 5,237,466 | 8/1993 | Glaser et al. . | |
| 5,278,703 | 1/1994 | Rub et al. | 360/51 |
| 5,303,097 | 4/1994 | Baba et al. | 360/73.02 |
| 5,436,881 | 7/1995 | Satomura | 360/51 X |

OTHER PUBLICATIONS

Chiang, "Multirate State Space Digital Controller for Sector Servo Systems", Proceeding of the 29th Conference on Decisions and Control (IEEE), Dec. 1990.

*Primary Examiner*—W. R. Young
*Assistant Examiner*—James L. Habermehl
*Attorney, Agent, or Firm*—Sughrue, Mion, Zinn, Macpeak & Seas

[57] ABSTRACT

In order to bring and keep a slave phase of rotation of a slave spindle into and in synchronism with a master phase, the master phase is represented in a predetermined time duration by zeroth through (N−1)-th master region data with an N-th master region datum added, where N represents a predetermined integer which is not less than two. The slave phase is represented, during one rotation of the slave spindle, by zeroth through (N−1)-th slave region data with an N-th slave region datum additionally used to provide a guard time. The zeroth through the (N−1)-th slave and master region data are compared to render a phase difference between the master and the slave phases either to zero or to a predetermined value. Alternatively, the master phase is represented in the predetermined time duration by a sequence of composite pulses which comprise N master clock pulses with at least one of the clock pulses omitted to indicate a start point of the sequence. The slave phase is represented, during one rotation of the slave spindle, by a combination of N slave clock pulses and a slave index signal. As a further alternative, the master phase is represented by a combination of the N master clock pulses without omission and a master index signal produced once in the predetermined time duration.

12 Claims, 20 Drawing Sheets

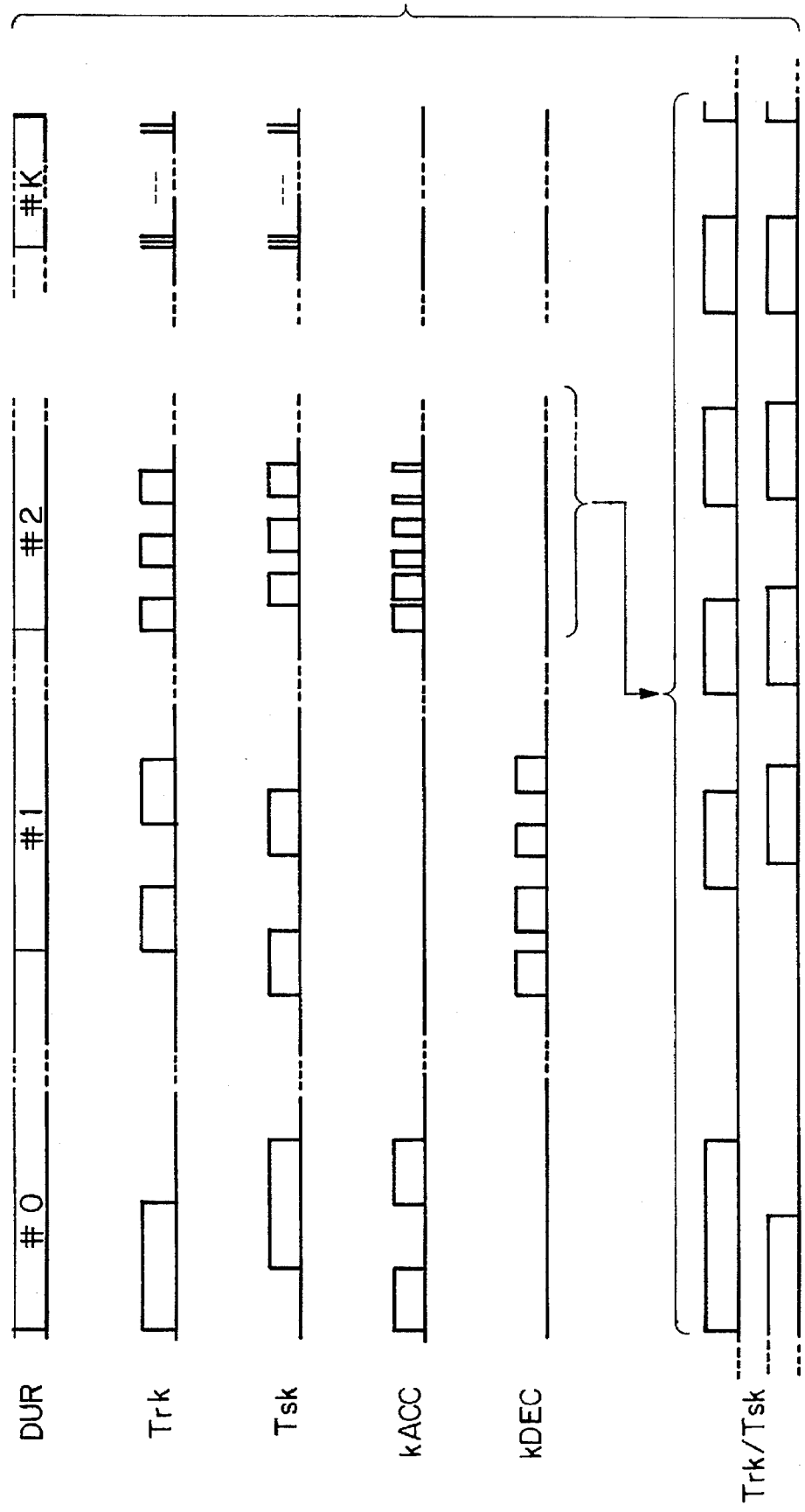

DEVICE HAVING SYNCHRONIZED SPINDLE CONTROL IN DISK DRIVES WITH AT LEAST TWO DATA PER ROTATION OF A DISK

This is a divisional of application Ser. No. 08/359,847 filed Dec. 20, 1994, now U.S. Pat. No. 5,555,140, which is a Continuation of application Ser. No. 07/976,408 filed Nov. 13, 1992, now abandoned.

BACKGROUND OF THE INVENTION

This invention relates to a device for synchronously rotating a plurality of spindles in disk drives used collectively as an information memory with each spindle used in driving a plurality of information memory disks.

It is possible to understand in connection with a device of the type described that a master reference is given by rotation of one of the disks that has a servo surface as a master disk and is driven by one of the spindles. Synchronized rotation of all disks is achieved in the disk drives by controllably rotating other spindles in accordance with the master reference. For this purpose, a slave reference is derived from rotation of one of the disks that is driven by each of the other spindles and has a similar servo surface as a slave disk. Such slave references are compared with the master reference to detect a phase difference between rotation of the master disk and rotation of each slave disk. The phase difference is used in controlling rotation of each of the other spindles to attain the synchronized rotation.

Such a device is disclosed in U.S. Pat. No. 4,907,105 issued to Fred Kurzweil, Jr., assignor to Maxtor Corporation, California. A similar device is revealed in U.S. Pat. No. 4,890,045 issued to Hiromi Ishizuka and assigned to the present assignee.

In a conventional device of the type disclosed in the Kurzweil or the Ishizuka patent, each of the master and the slave reference is given by an index pulse which is produced as each reference only once during one rotation of the master or the slave disk. Kurzweil and Ishizuka devices are excellently operable. It should, however, be noted that each reference is derived only once during one rotation of each disk. As a consequence, synchronized rotation is not precise depending on the circumstances. Furthermore, the synchronized rotation can not be rapidly achieved because a time interval of approximately one rotation of the disk is necessary to restore the synchronized rotation after out of synchronism is found in rotation of one of the other spindles.

SUMMARY OF THE INVENTION

It is consequently an object of the present invention to provide a device for synchronously rotating a plurality of spindles in disk drives, which device can precisely keep synchronized rotation of the spindles.

It is another object of this invention to provide a device which is of the type described and which can rapidly restore the synchronized rotation when out of synchronism is found in rotation of one of the spindles.

It is still another object of this invention to provide a device which is of the type described and in which at least two phase data are produced during one rotation of a disk driven by each spindle.

Other objects of this invention will become clear as the description proceeds.

According to this invention, there is provided a device which is for synchronously rotating first and second spindles driving first and second disks and which comprises: (A) first phase data producing means coupled to the first disk for producing N primary phase data representative of a first phase of rotation during one rotation of the first disk, where N represents an integer which is not less than two; (B) rotating means for controllably rotating the second spindle; (C) second phase data producing means coupled to the second disk for producing N secondary phase data representative of a second phase of rotation during one rotation of the second disk; (D) comparing means for comparing the primary and the secondary phase data to detect a phase difference between the first and the second phases and to produce a control signal in accordance with the phase difference; and (E) control means for controlling the rotating means by the control signal.

On describing the gist of an aspect of this invention, it is possible to understand that a device is for rotating a slave spindle in synchronism with a master phase and comprises: (a) master phase data producing means for producing a master phase datum representative of the master phase; (b) rotating means for controllably rotating the slave spindle; (c) slave phase data producing means coupled to the slave spindle for producing a slave phase datum representative of a slave phase of rotation of the slave spindle; (d) comparing means for comparing the master and the slave phase data to detect a phase difference between the master and the slave phase data and to produce a control signal in accordance with the phase difference; and (e) control means for controlling the rotating means by the control signal.

According to the above-mentioned aspect of this invention, the master phase data producing means of the above-understood device produces at least N primary phase data in a predetermined time duration collectively as the master phase datum, where N represents a prescribed integer which is not less than two. The slave phase data producing means of the above-understood device produces at least N secondary phase data during one rotation of the slave spindle collectively as the slave phase datum.

BRIEF DESCRIPTION OF THE DRAWING

FIG. 21 is a time chart for use in describing operation of the phase adjust signal producing circuit being illustrated.

DESCRIPTION OF THE PREFERRED EMBODIMENT

Figure 1:
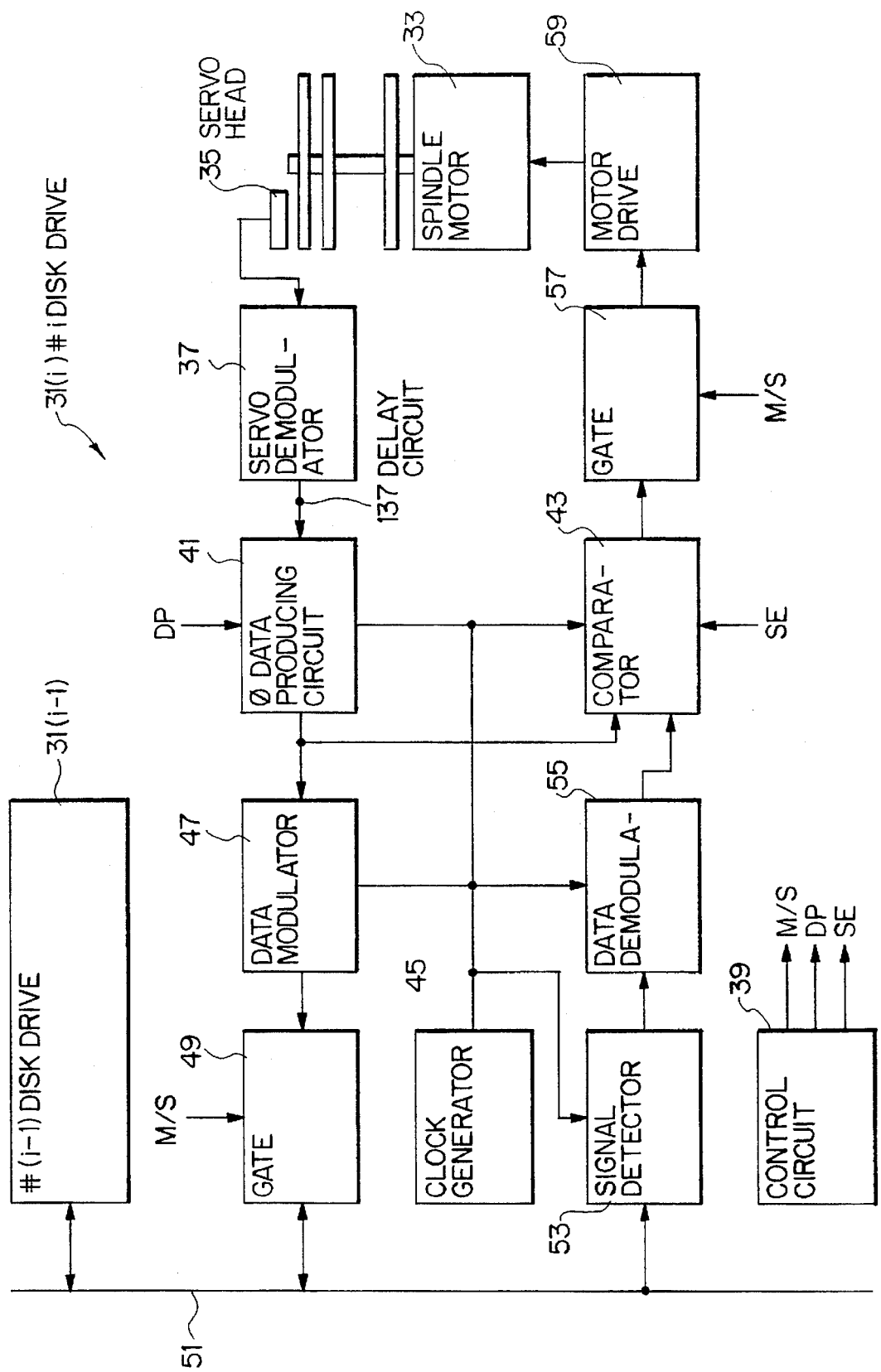
FIG. 1 is a block diagram of a disk drive which comprises in cooperation with another disk drive a synchronized spindle control device according to a first embodiment of the instant invention.

Referring to FIG. 1, a #(i−1) disk drive 31(i−1) and a #i disk drive 31(i) of an information memory are illustrated among #0 through #1 disk drives, where I represents an integer dependent on the scale of the information memory, i being variable between 1 and I, both inclusive. The #i disk drive 31(i) alone is depicted in detail. It should be noted that the #0 through the #I disk drives are similar in structure and are likewise operable unless specifically pointed out.

In FIG. 1, the #0 through the #I disk drives comprise in cooperation a synchronized spindle control device according to a first embodiment of the present invention. This device is for synchronously rotating zeroth through I-th spindles which are used in the #0 through the #I disk devices and each of which drives a plurality of information memory disks, such as magnetic disks. In other words, the synchronized spindle control device is for synchronously rotating first and second spindles in two of the #0 through the #I disk drives.

It is possible to understand that one of the two disk drives is used as a master drive and the other as a slave drive and without loss of generality that the #i disk drive 31(i) is the master drive and that the (i−1) disk drive 31(i−1) is the slave drive. In such an event, the disk drives other than the #i disk drive 31(i) are slave drives. The first and the second spindles will now be referred to as master and slave spindles with the first and the second disks called master and slave disks.

The #i disk drive 31(i) comprises an i-th memory comprising a plurality of memory disks driven by an i-th spindle that is rotated by an i-th spindle motor 33 as the master spindle. Together with the memory disks, the master spindle is rotated at a predetermined speed or rate of rotation, such as 3,600 rpm. Having a servo surface on which servo information is recorded in the manner known in the art, one of the memory disks serves as the master disk and is accompanied by a servo head 35 for reproducing the servo information. Merely for convenience of illustration, the master disk is depicted as a top disk of the memory disks with the servo surface directed upwardly of the figure.

In compliance with the servo information supplied from the servo head 35, a servo demodulator 37 produces a master index pulse once during one rotation of the master disk. It may be mentioned here that an i-th control circuit 39 generates a master/slave signal M/S, a data producing signal DP, and a synchronization executing signal SE, each of which is in one of active and inactive states at a time as by high and low levels. In the manner which will become clear as the description proceeds, the master/slave signal is for selectively using, as the master and the slave drives the disk drive comprising the control circuit under consideration. The data producing signal is for selectively putting a phase ($\phi$) data producing circuit 41 in active and inactive states. The synchronization executing signal is for selectively putting a comparator 43 in operation and out of operation. It will be presumed merely for simplicity of the description that the data producing signal puts the phase data producing circuit 41 in the active state. As for the comparator 43, the synchronization executing signal is in the inactive and the active states when the disk drive in question is the master and the slave drive.

A clock generator 45 generates a clock signal which will become clear as the description proceeds. Supplied with each index pulse from the servo demodulator 37 and with the clock signal, the phase data producing circuit 41 produces N phase data representative of a phase of rotation of the master disk during one rotation of the master disk in the manner which will presently be described. N represents an integer which is either equal to or greater than two. When produced in the master drive, the phase data are herein called primary phase data. The phase under consideration will be referred to as a master phase.

Connected to the phase data producing circuit 41 and supplied with the clock signal, a data modulator 47 modulates the phase data into a modulated signal for supply from the master drive towards the slave drive or drives. Modulation is possible in any one of frequency modulation, phase modulation, pulse code modulation, 2-7 code conversion, 1-7 code conversion, and others. The modulated signal is delivered to an output gate 49 which is controlled by the master/slave signal. In the master drive, the gate 49 is open to deliver the modulated signal to a signal line 51 connected to other disk drives, such as the #(i−1) disk drive 31(i−1).

In the manner described heretobefore, the #(i−1) disk drive 31(i−1) comprises similar parts. One of the memory disks is used as the slave disk. Together with the memory disks including the slave disk, the slave spindle is controllably rotated by an (i−1)-th spindle motor. The servo demodulator produces a slave index pulse once during one rotation of the slave disk.

In each slave drive, the phase data producing circuit produces phase data which are similar to those produced in the master drive and are herein called secondary phase data. The slave disk is rotated with a phase of rotation which will be referred to as a slave phase. The gate is closed so as not to deliver the modulated signal to the signal line 51. The spindle motor is controlled in the manner which will be described hereunder. Other elements will be described in connection with the #i disk drive 31(i) together with brief description thereof. It should now be understood that the #1 disk drive is a slave drive.

Connected to the signal line 51 and supplied with the clock signal from the clock generator 45, a signal detector 53 detects the modulated signal to produce a detection signal. Controlled by the clock signal, a data demodulator 55 demodulates the detection signal back into the primary phase data which may be called demodulated phase data.

The comparator 43 is put out of operation in the master drive and in operation in the slave drive. Controlled by the clock signal and supplied with the secondary phase data from the phase data producing circuit 41 of the slave drive, the comparator 43 compares the demodulator phase data with the secondary phase data to detect a phase difference, if any, between the master and the slave phases. It is possible to say that the comparator 43 compares the primary and the secondary phase data to produce a control signal in accordance with the phase difference. More particularly, the control signal indicates temporary acceleration and deceleration of a speed of rotation of the slave spindle when the slave phase lags behind and leads the master phase.

Controlled by the master/slave signal, an intermediate gate 57 delivers the control signal to a motor drive circuit 59 which controls the spindle motor 33. In the master drive, the intermediate gate 57 is put out of operation. The motor drive circuit 59 leaves the spindle motor 33 to rotate the master spindle at the predetermined speed of rotation.

In each slave drive, the control signal is supplied from the intermediate gate 57 to the motor drive circuit 59. Conveniently, the control signal consists of an acceleration and a deceleration signal, each of which is a binary signal having one of binary zero and one levels, such as the high and the low levels, at a time. It will be surmised without loss of generality that the acceleration and the deceleration signals are given the binary one level when the spindle motor 33 should be accelerated and decelerated. When the acceleration and the deceleration signals are given the binary zero level, the motor drive circuit 59 neither accelerates nor decelerates the spindle motor 33. It is possible to understand that the intermediate gate 57 produces the accelerating and the decelerating signals with the binary zero level in the master drive.

It is now admitted that the master drive may be simpler in structure than each slave drive. Provision of the control circuit 39, however, enables to implement the #0 through the #I disk drives by a common structure and to use one of the disk drives optionally as the master drive. Alternatively, it is possible to use as the master drive an equivalent circuit which is for producing the primary phase data without actually monitoring rotation of the master disk and to use all the #0 through the #I disk drives as the slave drives.

It is nevertheless possible to understand that the equivalent circuit equivalently comprises a first phase data producing arrangement, such as a combination of the servo head 35, the servo demodulator 37, and the phase data producing circuit 41, mechanically and electrically coupled to the first or the master disk for producing the N primary data representative of the first or the master phase of rotation of the first disk during one rotation of the first disk. In the synchronized spindle control device being illustrated, the comparator 43 serves as a comparing arrangement for comparing the primary and the secondary phase data to produce the control signal.

A combination of the spindle motor 33 and the motor drive circuit 59 is used as a rotating arrangement for controllably rotating the spindle in the disk drive taken into consideration. Another combination of the intermediate gate 57 and the motor drive circuit 59 is used as a control arrangement for controlling the rotating arrangement by the control signal. Incidentally, it is possible to manually or otherwise make the control circuit 39 generate, for example, the master/slave signal selectively in the active and the inactive states.

Figure 2:
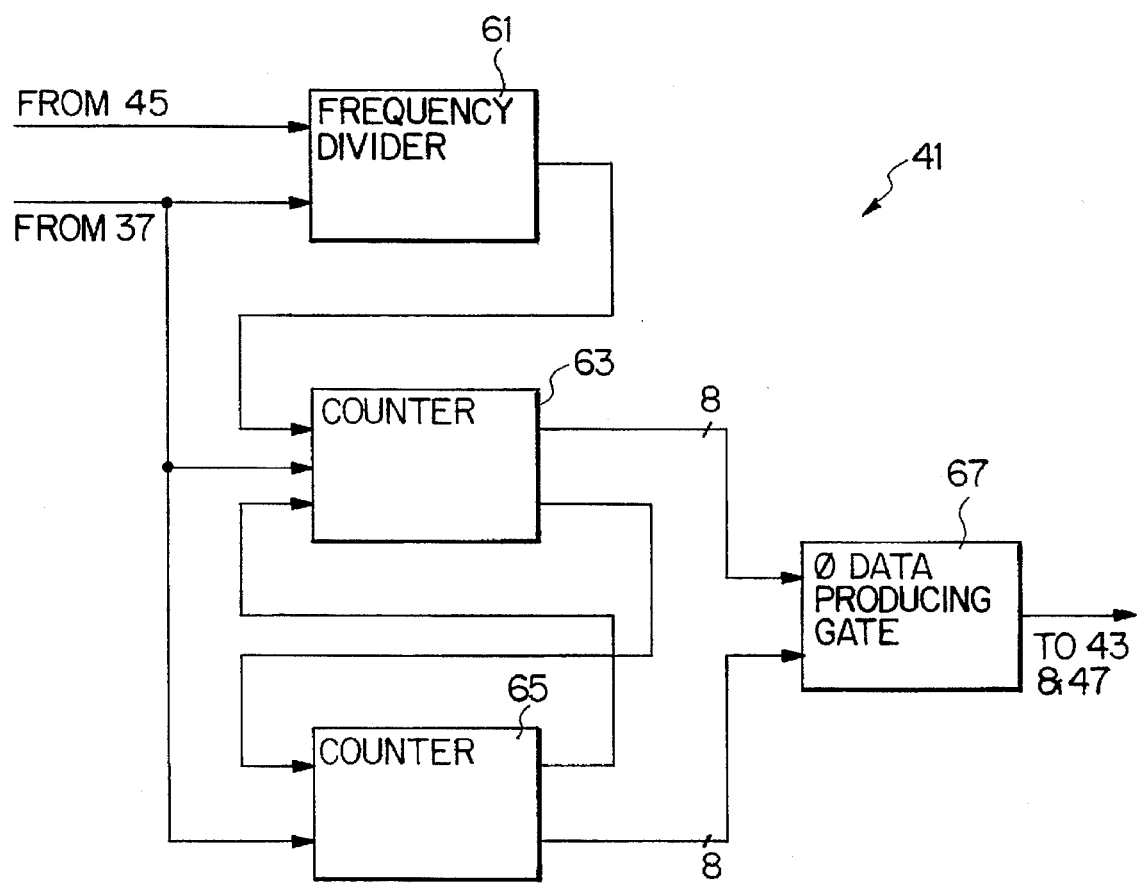
FIG. 2 is a block diagram of a phase data producing circuit for use in the disk drive illustrated in FIG. 1.

Turning to FIG. 2, the phase data producing circuit 41 comprises a frequency divider 61 for frequency dividing the clock signal supplied from the clock generator 45 by, for instance, a frequency division factor of four to produce a frequency demultiplexed (clock) sequence. The frequency divider 61 is reset by a leading edge of each master or slave index pulse so that the frequency demultiplexed sequence may have a leading edge of one of frequency divided pulses coincident with a leading edge of one of clock pulses of the clock signal even when the servo demodulator 37 (FIG. 1) produces the index pulses without synchronism with the clock pulses.

A first counter 63 is reset by the leading edge of each index pulse to a first count of zero and counts the frequency divided pulses repeatedly from zero to thirty-one to produce a first count signal representative of the first count of the frequency divided pulses in eight-bit parallel. Counting the first count from thirty-one up to zero, the first counter 63 produces a count pulse of a pulse sequence. It should be noted in connection with the above that the first counter 63 is controlled by a suspend signal which will shortly be described. If the suspend signal is active, the first counter 63 keeps the count of zero to which the first count is counted up.

A second counter 65 is reset by the leading edge of each index pulse to a second count of zero and counts the count pulses of the pulse sequence from zero to a predetermined integer R to produce a second count signal representative of the second count as a binary number in eight-bit parallel. When the second count is counted from the predetermined integer less one up to the predetermined integer, the second counter 65 activates the suspend signal, which remains active until the second counter 65 is reset.

Supplied with the first count signal, a phase data producing gate 67 selectively gives binary zero and one values to the primary or the secondary phase data. Furthermore, the first count of a predetermined count makes the phase data producing gate 67 produce the primary or the secondary phase data with one of the second count of zero through the predetermined integer represented in the manner which will soon be exemplified. The primary phase data may alternatively be the demodulated phase data.

Figure 3:
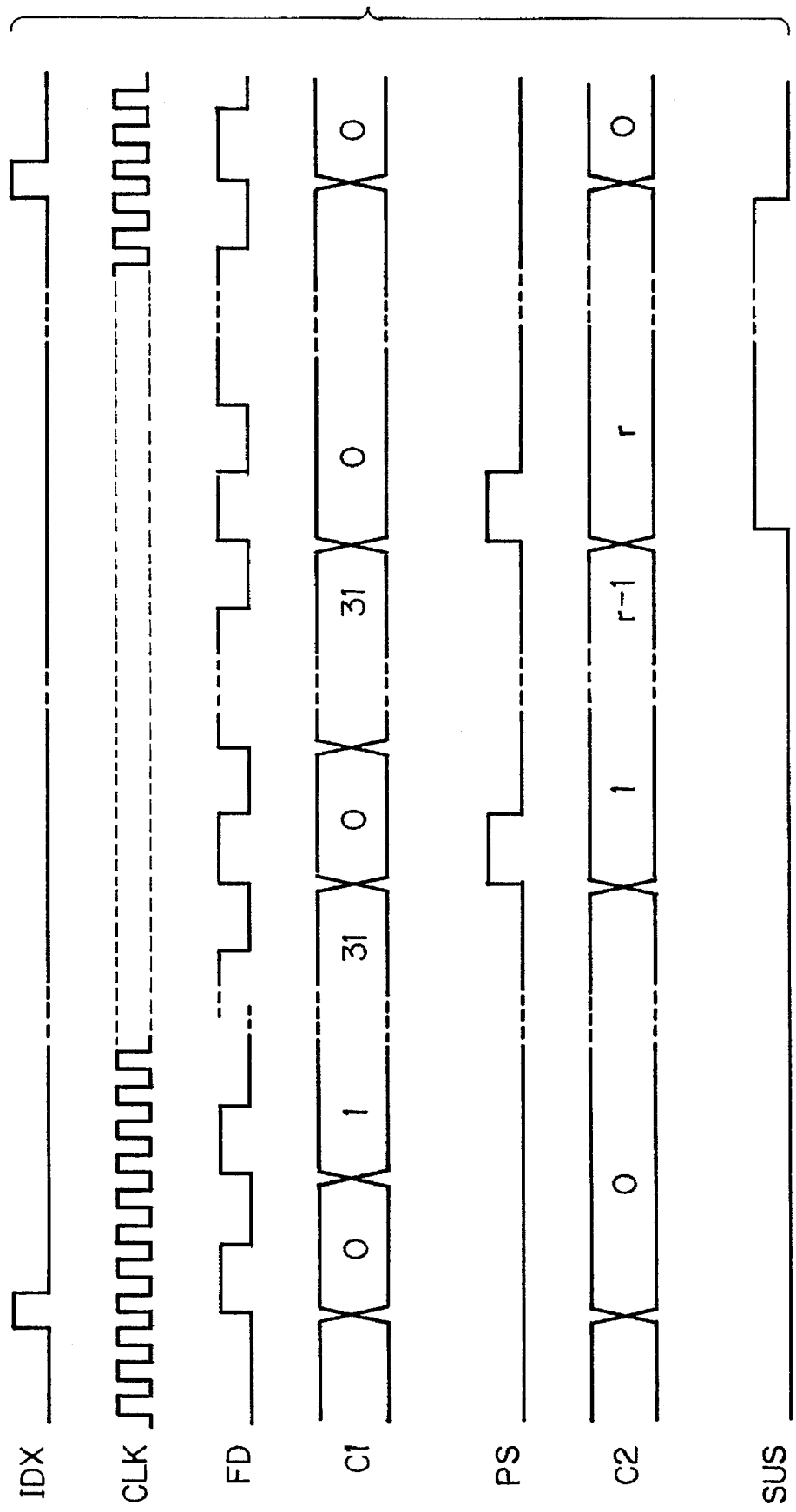
FIG. 3 is a time chart for use in describing operation of the phase data producing circuit depicted in FIG. 2.

Referring to FIG. 3 in addition to FIG. 2, the master or the slave index pulses are illustrated along a first or top row labelled IDX. The clock pulses are depicted along a second row labelled CLK. The frequency divided pulses are shown along a third row labelled FD. The first count signal is exemplified along a fourth row labelled C1 with the pulse sequence shown along a fifth row labelled PS. The second count signal is illustrated along a sixth row labelled C2 with the suspend signal depicted along a seventh or bottom line labelled SUS.

Figure 4:
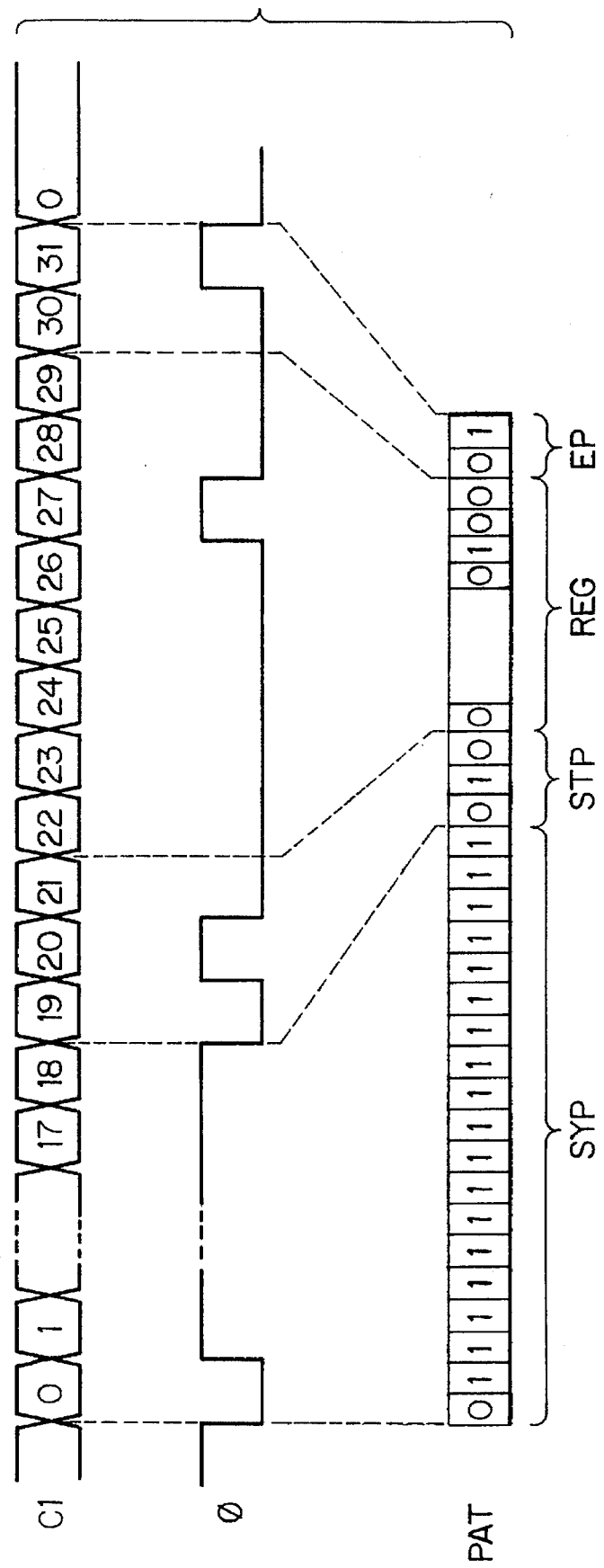
FIG. 4 is another time chart for use in describing operation of the phase data producing circuit depicted in FIG. 2.

Turning to FIG. 4, the first count signal is depicted along a first or top row labelled C1. It will be assumed that the primary, the secondary, or the demodulated phase data are given the binary zero value in the manner exemplified along a second or middle row labelled φ when the first count signal represents zero as the first count. While the first count signal represents from one to eighteen, the phase data are given the logic one level. When the first count signal represents nineteen, twenty, and twenty one, the phase data are given the binary zero, the binary one, and the binary zero values, respectively. While the first count signal represents twenty-two through twenty-six, the phase data are selectively given the binary zero and one values. When the first count signal represents twenty-seven, from twenty-eight to thirty, and thirty-one, the phase data are given the binary zero, the binary one, and the binary zero values, respectively. The first count of twenty-two is the predetermined count described before.

In this manner, the primary, the secondary, or the demodulated phase data represent a predetermined pattern illustrated along a third or bottom row labelled PAT with the binary zero and one values shown by numerals 0 and 1. The phase data represent the predetermined pattern in a count cycle during which the first count varies from zero to thirty-one and will be said to indicate a region.

More in detail, the predetermined pattern is used as a synchronization pattern SYP while the first count is counted up from zero to eighteen. The synchronization pattern indicates a beginning of the region and is used in establishing synchronism. The predetermined pattern is used as a start pattern STP while the first count varies from nineteen up to twenty-one. Indicated by the start pattern, a region number REG is indicated by the predetermined pattern while the first count is counted up from the predetermined count of twenty-two to twenty-nine. In the meanwhile, the region number is represented by the second count signal with eight parallel bits produced in series from the most significant bit of the binary number. In the example being illustrated, the region number is assumed as decimal four, namely, as binary "100". The predetermined pattern is furthermore used as an end pattern EP while the first count represents thirty and thirty-one.

Figure 5:
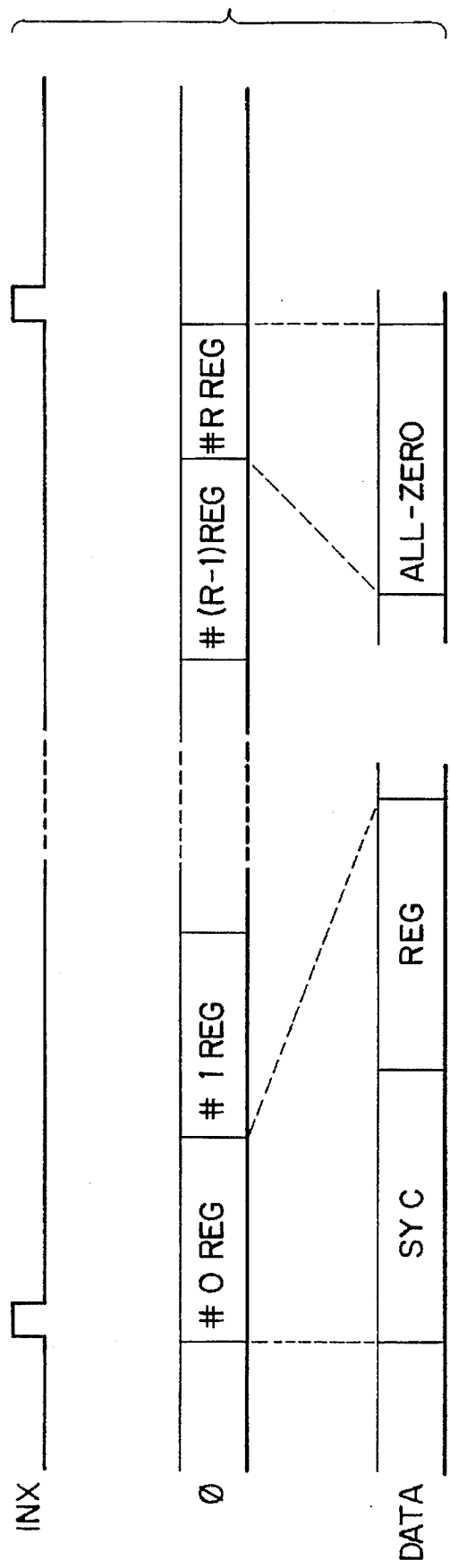
FIG. 5 is still another time chart for use in describing operation of the phase data producing circuit shown in FIG. 2.

Further turning to FIG. 5 with FIGS. 3 and 4 additionally referred to, the master or the slave index pulses are illustrated along a first or top row labelled INX. The primary, the secondary, or the demodulated phase data are exemplified along a second or middle row labelled φ. Between the leading edges of two consecutive ones of the index pulses, the phase data are divided into zeroth through (R−1)-th and R-th regions #0 REG to #(R−1) REG and #R REG. Each of the zeroth through the (R−1)-th regions has a predetermined region duration which is equal to the count cycle. The R-th region has a variable region duration which depends on a time instant of appearance of the later one of the two consecutive index pulses. Such regions represent information data described along a third or bottom row labelled DATA. In each of the zeroth through the (R−1)-th regions, the information data represent a synchronization code SYC and the region number REG. The start and the end patterns STP and EP are not depicted herein. The R-th region is given by a succession of the binary zero values. This succession is called an all-zero pattern and is used in order to wait appearance of the later one of the index pulses. The all-zero pattern is derived from the first count of zero which the first count signal represents while the second count is equal to the predetermined integer R.

Reviewing FIGS. 1 through 5, it is understood that the synchronized spindle control device comprises in the master drive 31(i) or its equivalent circuit a first phase data producing arrangement (41, 45) coupled to a first disk for producing N primary phase data representative of a first phase of rotation of the first disk. In each slave drive, such as 31(i−1), a second phase data producing arrangement is coupled to a second disk and is for producing N secondary phase data representative of a second phase of rotation of the second disk. The slave drive comprises a comparing arrangement (43, 45) connected to the rotating arrangement (33, 57, 59) for comparing the primary and the secondary phase data to detect a phase difference between the first and the second phases and to produce a control signal in accordance with the phase difference.

Preferably, the N primary phase data comprise (R +1) primary region data identified by zeroth through R-th region numbers, where (R+1) is equal to the predetermined integer R plus one and is substantially equal to N and may be either greater or less than N. The N secondary phase data comprise (R+1) secondary region data identified by the zeroth through the R-th region numbers. It is possible to understand that the all-zero pattern or code is used as the R-th region number.

The primary and the secondary phase data may alternatively be called master and slave phase data. Each of the zeroth through the (R−1)-th region data has the predetermined region duration. In particular in the slave phase data, the R-th region datum has the variable region duration. In any event, it is more preferable that each of the zeroth through the (R−1)-th region data should include a synchronization code preceding an r-th region number, where r is variable between zero and the predetermined integer R less one, both inclusive.

Figure 6:
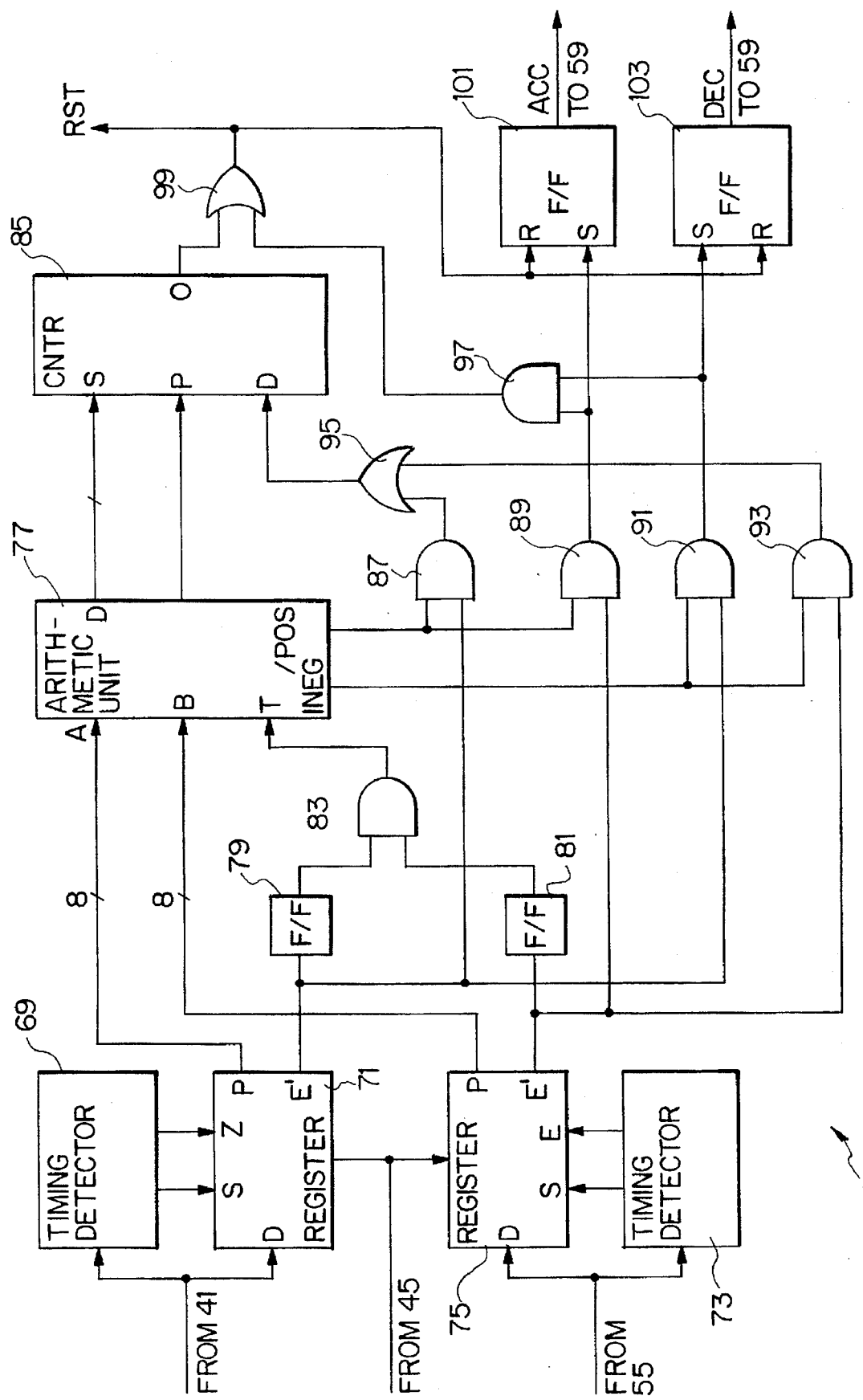
FIG. 6 is a block diagram of an example of a comparator for use in the disk drive illustrated in FIG. 1.

Referring now to FIG. 6 in addition to FIGS. 1 and 5, the primary or the secondary phase data will be referred to as local phase data. The comparator 43 comprises a local timing detector 69 and a local register 71 supplied with the local phase data from the phase data producing circuit 41. An external timing detector 73 and an external register 75 are supplied with the demodulated phase data from the demodulator 55. From the clock generator 45, the clock signal is supplied to the local and the external registers 71 and 75.

The local and the external timing detectors 69 and 73 are similarly operable. The local and the external registers 71 and 75 are likewise operable. Each timing detector 69 or 73 detects a succession of the synchronization code SYC and the region number REG to produce a start pulse at the beginning of each region number and an end pulse at the end of each succession for delivery to start and end input terminals S and E of each register 71 or 75. Using each clock pulse as a write pulse, the register 71 or 75 is loaded with the region number partitioned by the start and the end pulses in the local or the demodulated phase data supplied to a data input terminal D. The region number is kept in the register 71 or 75 until renewal and is produced as an output datum in eight-bit parallel from parallel output terminals P. In the example being illustrated, the register 71 or 75 produces the end pulse from an end output terminal E as an output pulse.

Figure 7:
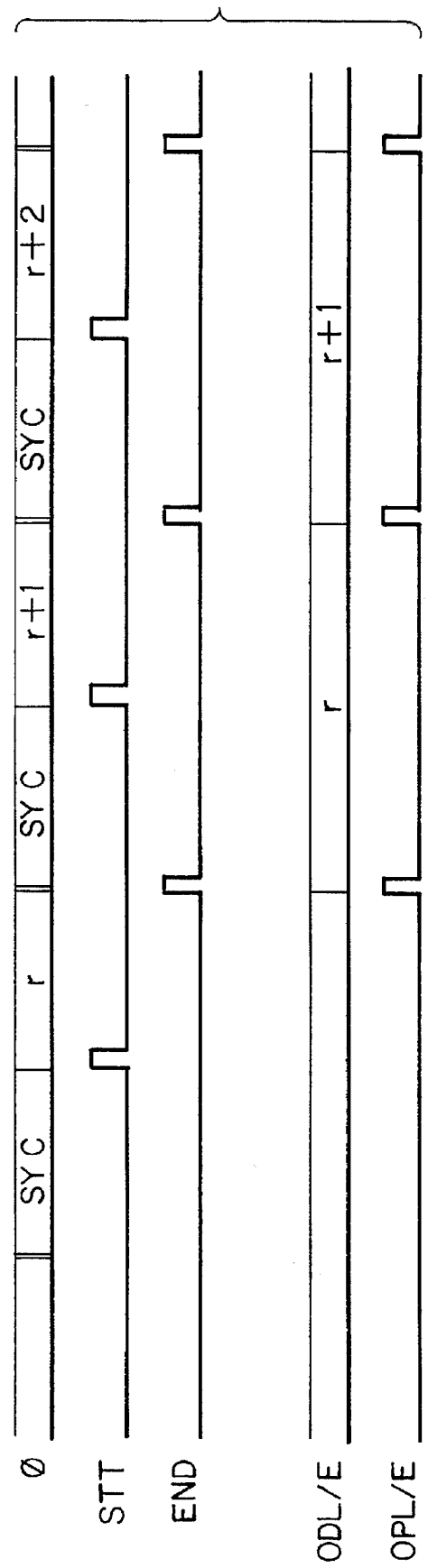
FIG. 7 is a time chart for use in describing operation of a first part of the comparator illustrated in FIG. 6.

Turning to FIG. 7 during a short while with FIGS. 5 and 6 again referred to, the local or the demodulated phase data are illustrated along a first or top row labelled φ, where r represents the region number by a pertinent one of zero through the predetermined integer less one (R−1). Start pulses are depicted along a second row labelled STT. End pulses are depicted along a third row labelled END. Output data of the local register 71 or of the external register 75 are illustrated along a fourth row labelled ODL/E. Output pulses of the local register 71 or of the external register 75 are shown along a fifth or bottom row labelled OPL/E.

Turning back to FIG. 6 with FIG. 1 again referred to, the output data of the local and the external registers 71 and 75 are delivered to plus and minus input terminals A and B of an arithmetic unit 77. A combination of flip-flop circuits (F/F) 79 and 81 and an AND gate 83 is supplied with the output pulses of the local and the external registers 71 and 75 and is for supplying a timing signal to a timing input terminal T of the arithmetic unit 77. Timed by the timing signal, the arithmetic unit 77 calculates a difference by subtracting the output datum of the external register 75 from the output datum of the local register 71.

On calculating the difference, the timing signal is indispensable. This is because the output data are produced by the local and the external registers 71 and 75 independently of each other. At first, the flip-flop circuits 79 and 81 are put collectively in an initial state of producing their outputs with a common low level. When the output pulse is supplied from the local register 71, the output of the flip-flop circuit 79 is given a high level. When the output pulse is supplied from the external register 75, the output of the flip-flop 81 is also given the high level. This gives the high level to the timing signal to indicate that each of the output data of the local and the external registers 71 and 75 represents a certain fixed value. Otherwise, calculation of the difference by the arithmetic unit 77 is meaningless.

The arithmetic unit 77 judges whether or not the difference is equal to zero and whether the difference has not a negative value or a positive value. The arithmetic unit 77 produces from data output terminals D a bit parallel signal which represents a count of two and a sum of the absolute value of the difference and one as a bit parallel datum when the difference is and is not equal to zero. The arithmetic unit 77 additionally produces from a pulse output terminal P a partition pulse indicative of a partition between two consecutive ones of the parallel bit data. The parallel bit signal and the partition pulse are delivered to parallel bit input and partition signal input terminals S and P of a counter 85.

The arithmetic unit 77 furthermore produces non-negative and non-positive signals, each with the high level from its non-negative and non-positive output terminals/NEG and/POS when the difference has not the negative and the positive values. A combination of first through fourth AND gates 87, 89, 91, and 93 serves as a switching gate. Opened by the non-positive signal, the first AND gate 87 allows passage therethrough of the output pulse of the local register 71 as a first output pulse. Opened by the non-negative signal, the second AND gate 89 causes output pulse of the external register 75 to pass therethrough as a second output pulse. In like manners, the third and the fourth AND gates 91 and 93 produce third and fourth output pulses. Supplied with the first and the fourth output pulses, a decrement OR gate 95 delivers a decrement pulse to a decrement input terminal D of the counter 85.

The counter 85 holds the bit parallel signal when the partition pulse is received. Furthermore, the counter 79 subtracts one from the bit parallel datum each time when the decrement pulse is received. When the bit parallel datum decreases to zero, the counter 85 produces a counter output pulse from its output terminal 0. In the manner described above, the decrement pulse is produced by the output pulse of the local register 71 during presence of the non-positive signal with the high level and by the output pulse of the external register 75 while the non-negative signal is active. One is consequently subtracted from the bit parallel datum upon appearance of the output pulse from the local and the external registers 71 and 75 when the difference is not positive and negative in the counter 85.

Supplied with the second and the third output pulses, an additional AND gate 97 produces an additional output pulse in a particular case which will later be described. Supplied with the counter output pulse and the additional output pulse, a reset OR gate 99 produces a reset pulse RST, which resets first and second set/reset flip-flops 101 and 103. The reset pulse furthermore resets the timing detectors 69 and 73 and the registers 71 and 75. In this event, the flip-flop circuits 79 and 81 are supplied with the low level. The counter 85 is given an initial value which is not equal to zero irrespective of the region numbers.

The second output pulse sets the first set-reset flip-flop 101. By its set output, the first set/reset flip-flop 101 supplies the motor drive circuit 59 through the intermediate gate 57 with the acceleration signal which is described hereinabove and is now denoted by ACC. The third output pulse sets the second set/reset flip-flop 103. By its set output, the second set/reset flip-flop 103 supplies the motor drive circuit 59 with the deceleration signal which is now indicated by DEC.

Figure 8:
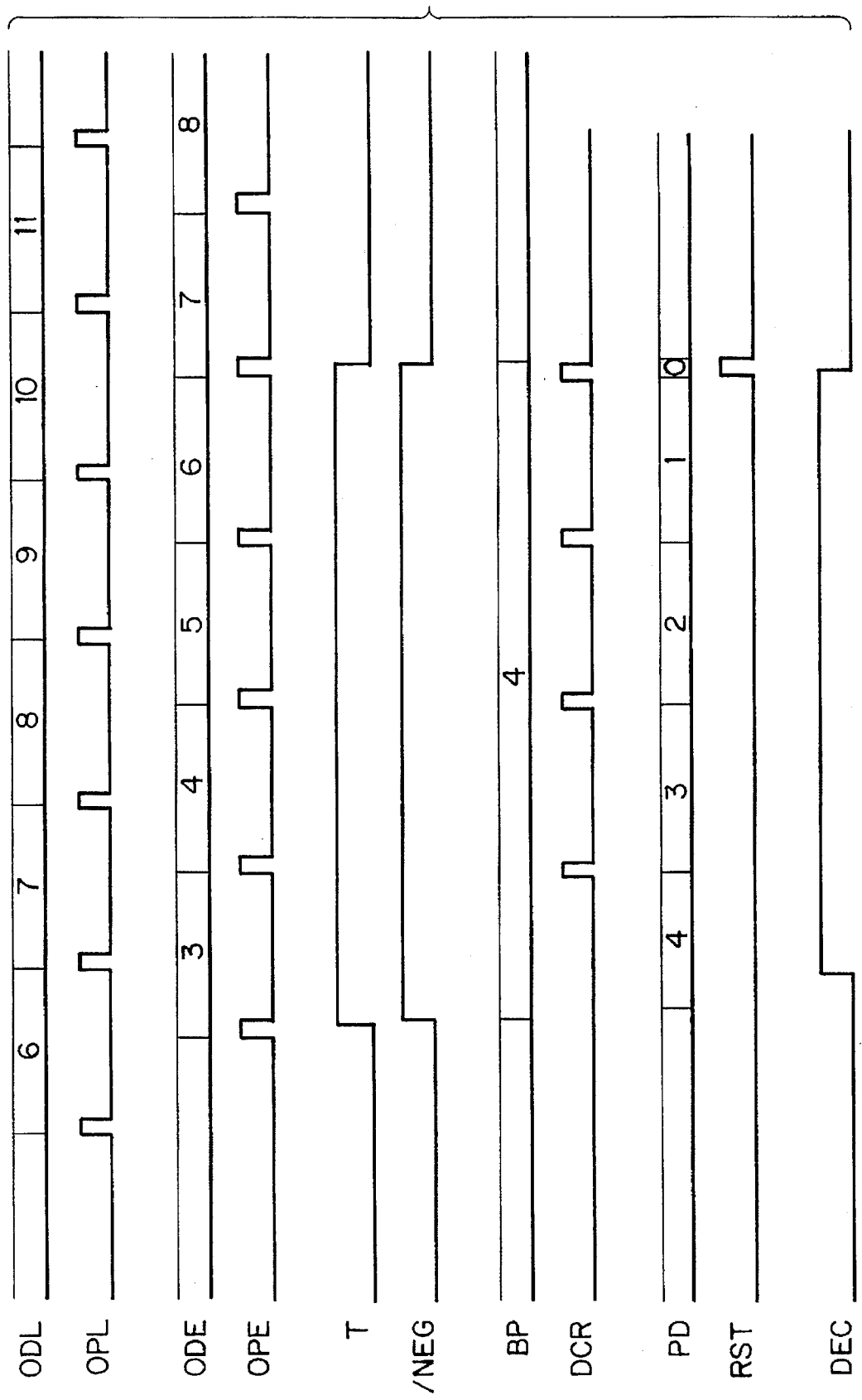
FIG. 8 is a time chart for use in describing operation of a second part of the comparator depicted in FIG. 6.

Referring to FIG. 8 in addition to FIG. 6, it will be presumed that the slave phase data lead the master phase data. The output datum of the local register 71 is exemplified along a first or top row labelled ODL with the region numbers assumed to be 6 through 11. The output pulses of the local register 71 are illustrated along a second row labelled OPL. The output datum of the external register 75 is exemplified along a third row labelled ODE with the region numbers assumed as three through eight. The output pulses of the external register 75 are depicted along a fourth row labelled OPE. The timing signal is illustrated along a fifth row labelled T. In this manner, the decrement OR gate 95 renders the timing signal active when one of the output signals is produced by the external register 75 after production of one of the output pulses by the local register 71.

In the example being illustrated, the difference is equal to plus three and is not negative. The arithmetic unit 77 therefore produces from the non-negative output terminal/NEG the non-negative signal with the high level in the manner shown along a sixth line labelled/NEG. Inasmuch as the difference is not equal to zero, the bit parallel signal represents four with one added to the absolute value of the difference. The bit parallel signal is depicted along a seventh row labelled BP. Furthermore, the fourth AND gate 93 allows passage therethrough of the output pulses produced by the external register 75.

The decrement OR gate 95 produces the output pulses of the external register 75 as decrement pulses illustrated along an eighth row labelled DCR. The bit parallel datum decreases in the counter 85 in the manner depicted along a ninth row labelled PD. When the bit parallel datum decreases to zero, the reset OR gate 99 produces the counter output pulse as the reset pulse shown along a tenth row labelled RST.

Inasmuch as the non-negative signal is produced, the third AND gate 91 causes the output pulse of the local register 71 to pass therethrough to set the second set/reset flip-flop 103. The deceleration signal is therefore energized until production of the reset pulse. The deceleration signal is depicted along an eleventh or bottom row labelled DCL.

In the example illustrated in the foregoing, the deceleration signal is active from a time instant of an end of the region number "6" in the output datum of the local register 71 until a later time instant at which indication of the region number "6" ends in the output datum of the external register 75. As a result, a phase lead of rotation of the spindle in the slave drive is optimally reduced by decelerating the spindle motor 33 described in conjunction with FIG. 1.

Figure 9:
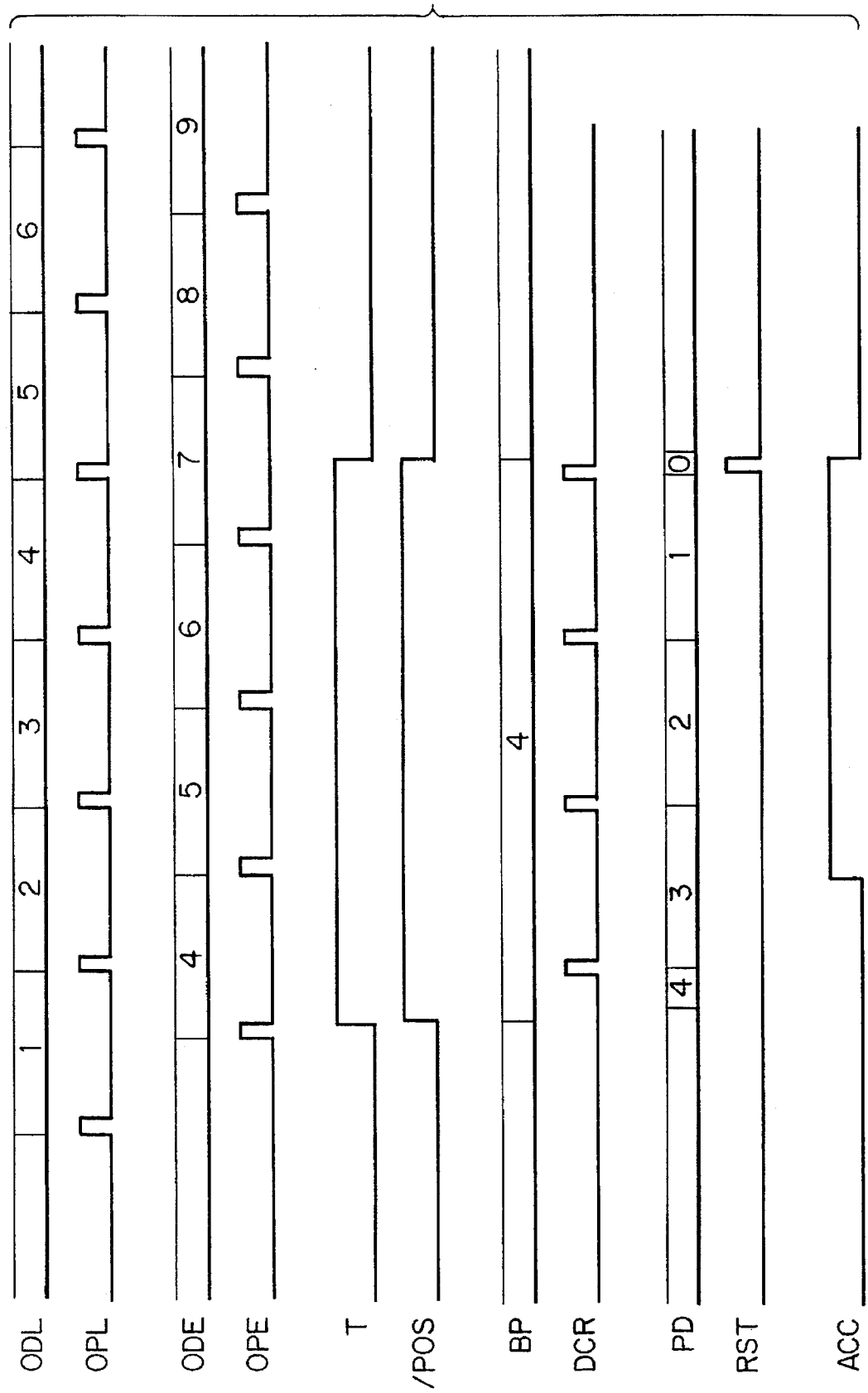
FIG. 9 is another time chart for use in describing operation of the second part of the comparator.

Turning to FIG. 9 with reference to FIG. 6 continued, it will be presumed that the local phase data lag behind the demodulated phase data. The output datum of the local register 71 is exemplified along a first or top row labelled ODL. The output pulses of the local register 71 are illustrated along a second row labelled OPE. The output datum of the external register 75 is exemplified along a third row labelled ODE. The output pulses of the external register 75 are shown along a fourth row labelled OPE. The timing signal is depicted along a fifth row labelled T.

In the example being illustrated, the difference is equal to minus three. As a consequence, the arithmetic unit 77 produces the non-positive output in the manner illustrated along a sixth row labelled/POS. The bit parallel signal represents four as depicted along a seventh row labelled BP.

A combination of the first AND gate 87 and the decrement OR gate 95 produces the output pulses of the local register 71 as the decrement pulses in the manner depicted along an eighth row labelled DCR. The bit parallel datum decreases as illustrated along a ninth row labelled PD. The reset pulse is shown along a tenth row labelled RST.

Through the second AND gate 89, one of the output pulses of the local register 71 sets the first set/reset flip-flop 101 to energize the acceleration signal illustrated along an eleventh or bottom row labelled ACC that is produced immediately after the non-positive signal is given the high level. A phase lag of rotation of the spindle is optimally reduced by accelerating the spindle motor 33 described in connection with FIG. 1. The acceleration signal is deenergized by the reset pulse.

Figure 10:
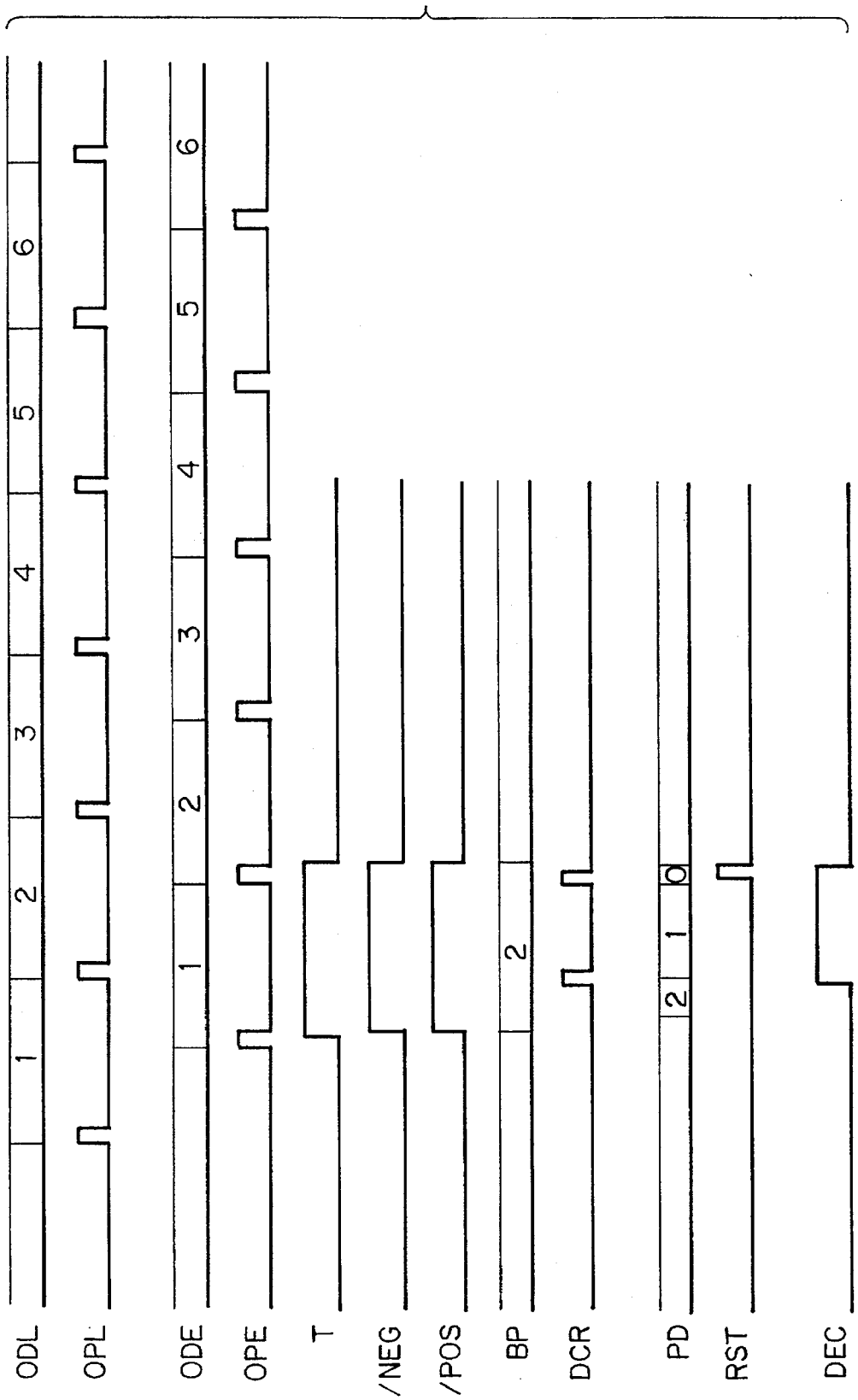
FIG. 10 is still another time chart which corresponds to the time charts illustrated in FIGS. 9 and 10.

Further turning to FIG. 10 with FIG. 6 continuously referred to, it will be presumed that the local phase data a little lead the master phase data. More specifically, the local phase data lead the demodulated phase data less than the count cycle. The local phase data may lag behind the demodulated phase data to this extent. In this event, operation is substantially identical. Signals will be depicted with the operation described very briefly.

Again, the output datum of the local register 71 is exemplified along a first or top row labelled ODL. Its output pulses are illustrated along a second row labelled OPL. The output datum of the external register 75 is exemplified along a third row with a label of ODE. Its output pulses are shown along a fourth row with a label of OPE. The timing signal becomes as depicted along a fifth row labelled T.

In the arithmetic unit 77, the difference is now equal to zero. Both the non-negative and the non-positive signals are given the high level in the manner illustrated along sixth and seventh rows labelled /NEG and/POS. Inasmuch as the difference is equal to zero, the arithmetic unit 77 produces the bit parallel signal representative of the count of two as illustrated along an eighth row labelled BP. The first and the fourth AND gates 87 and 93 successively produce the output pulses of the local and the external registers 71 and 75. The decrement OR gate 95 therefore produces two successive decrement pulses depicted along a ninth row labelled DCR.

In the counter 85, the bit parallel datum decreases from the count of two to zero in the manner exemplified along a tenth row labelled PD. The reset OR gate 99 produces the reset pulse shown along an eleventh row labelled RST.

The second and the third AND gates 89 and 91 successively allow the output pulses of the local and the external registers 71 and 75 to pass therethrough. It should be noted under the circumstances that the reset OR gate 99 produces the reset pulse concurrently with passage of the output pulse of the external register 75 through the second AND gate 89. Consequently, the first set/reset flip-flop 101 is kept reset. Only the second set/reset flip-flop 103 is set to produce the deceleration signal in the manner exemplified along a twelfth or bottom row labelled DEC.

Reviewing FIGS. 6 through 10, it will finally be presumed that the local and the demodulated phase data are in complete synchronism. In the arithmetic unit 77, the difference is equal to zero. The second and the third AND gates 89 and 91 concurrently produce the output pulses of the local and the external registers 71 and 75. This would simultaneously set the first and the second set/reset flip-flops 101 and 103.

In order to cope with such a particular case, the additional AND gate 97 produces the additional output pulse. Through the reset OR gate 99, the additional output pulse is used as the reset pulse. This prevents the first and the second set/reset flip-flops 101 and 103 from being simultaneously set. The first and the second set/reset flip-flops 101 and 103 are therefore kept reset. In FIG. 1, the spindle motor 33 of the slave drive is neither accelerated nor decelerated. The spindle is rotated with synchronism kept relative to the spindle in the master drive.

Reviewing FIGS. 1 and 6, it is now appreciated that the comparator 43 comprises first and second parts operable in the manner illustrated with reference to FIG. 7 and to FIGS. 8 through 10. For convenience of the description which follows, r will be written by p and q in the demodulated and the secondary phase data supplied to the first part as master and slave phase data from signal line 51 through the data demodulator 55 and from the phase data producing circuit 41 of the slave drive.

In the first part, a combination of the local timing detector 69 and the local register 71 produces a q-th slave region number and the output pulse of the local register 71. The output pulse is produced as a slave output pulse immediately before production of the q-th slave region number. Another combination of the external timing detector 73 and the external register 75 produces a p-th master region number and a master output pulse immediately before production of the p-th master region number.

In the second part, the arithmetic unit 77 calculates the difference by subtracting the p-th master region number from the q-th slave region number and judges whether or not the difference is equal to zero and whether the difference is not negative or is not positive. In the manner described before, the arithmetic unit 77 produces the bit parallel datum and the non-negative and the non-positive signals. The bit parallel datum may be referred to merely as an output datum.

A combination of the first and the fourth AND gates 87 and 93 and the decrement OR gate 85 serves as a first logic circuit. While the non-negative signal is produced, the first logic circuit produces the master output pulse as the decrement pulse in the manner described in conjunction with FIG. 8. While the non-positive signal is produced, the first logic circuit produces the slave output pulse as the decrement pulse as described in connection with FIG. 9. If the phase difference is less than the predetermined region duration and consequently if the difference is equal to zero to give the high level both to the non-negative and the non-positive signals, the first logic circuit produces the decrement pulse twice when the master and the slave output pulses are successively produced within the region duration in the manner described with reference to FIG. 10.

The counter 85 is operable as above. The counter output pulse may alternatively be called a zero representing pulse.

Another combination of the second and the third AND gates 89 and 91 serves as a second logic circuit. While the non-negative signal is produced as in FIGS. 8 and 10, the second logic circuit produces the slave output pulse as a first set pulse. While the non-positive signal is produced as in FIGS. 9 and 10, the second logic circuit produces the master output pulse as a second set pulse.

Serving as an accelerating flip-flop, the first set/reset flip-flop 101 is set by the first set pulse and reset by the zero representing pulse. While set, the accelerating flip-flop produces the control signal to make the control arrangement accelerate the speed of rotation of the second disk in the slave drive.

The second set/reset flip-flop 103 serves as a decelerating flip-flop set by the second set pulse and reset by the zero representing pulse. While set, the decelerating flip-flop produces the control signal to make the control arrangement decelerate the speed of rotation.

The additional AND gate 97 serves as an additional logic circuit. The additional output pulse may be referred to briefly as an additional pulse. In the manner described reviewing FIGS. 6 and 10, the additional pulse is produced if the first and the second phases are in complete synchronism and consequently if the master and the slave output pulses are simultaneously produced while both the non-negative and the non-positive signals are produced. The additional pulse is produced concurrently with the first and the second set pulses. Consequently, the accelerating and the decelerating flip-flops 101 and 103 are not set but kept reset. Rotation of the second disk is neither accelerated nor decelerated in the slave drive. The second disk is constantly rotated with synchronism kept.

It is now understood that the arithmetic unit 77 may judge whether or not the difference is equal to a predetermined value and judge whether the difference is not less than the predetermined value or greater than the predetermined value. In this event, the non-negative and the non-positive signals may be called not-less and not-greater signals. Furthermore, it is possible to optionally adjust the predetermined value as desired. Incidentally, the arithmetic unit 77 is readily implemented by a substracter and a read-only memory. Accessed by the difference as through an AND gate only when the timing signal is produced, the read-only memory should produce the output datum and the not-less and/or the not-greater signals.

Figure 11:
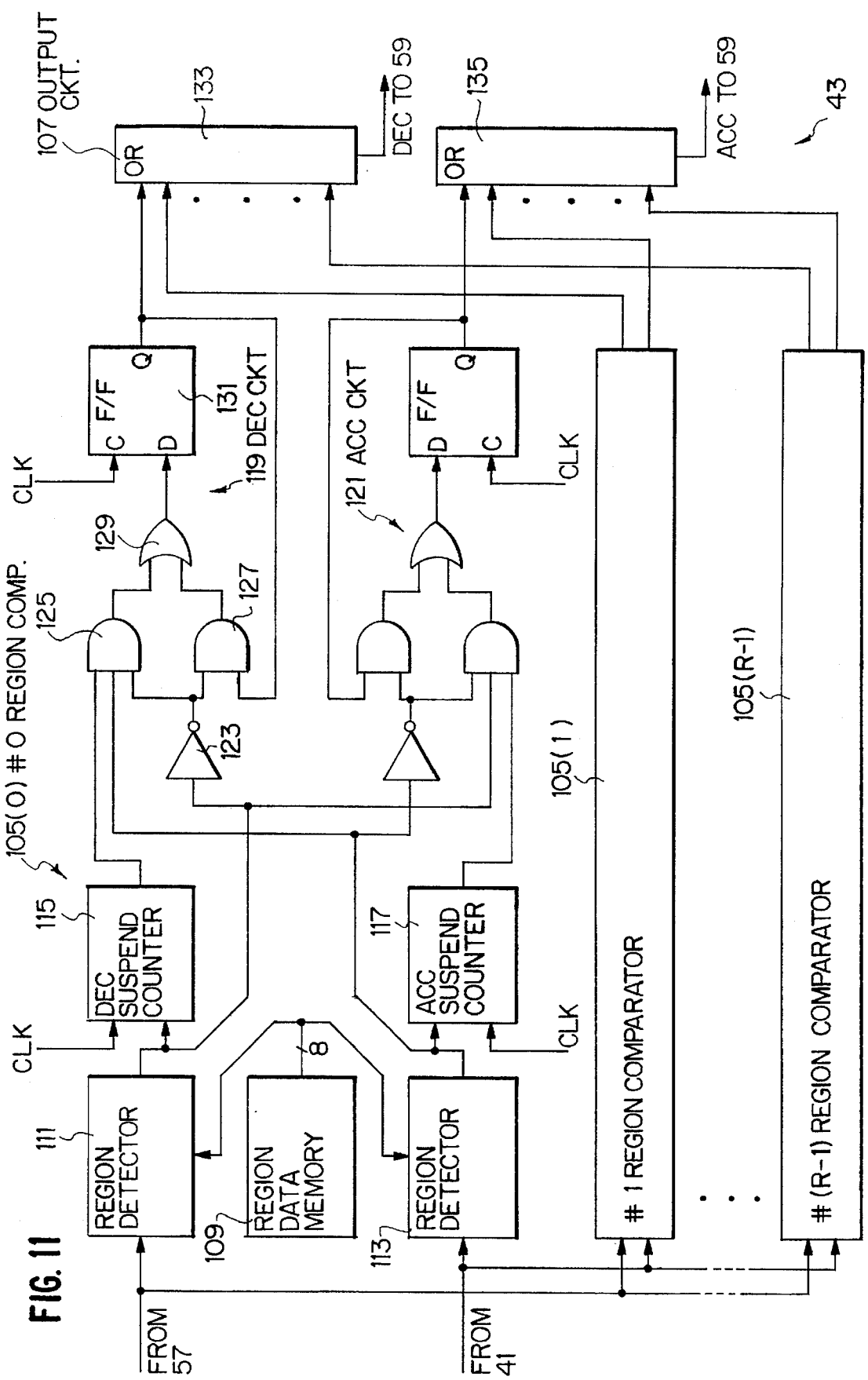
FIG. 11 is a block diagram of another example of the comparator for use in the disk drive depicted in FIG. 1.

Referring now to FIG. 11 in addition to FIG. 1, the comparator 43 may comprise zeroth through (R−1)-th region comparators 105(0), 105(1), . . . , and 105(R−1) and an output circuit 107. The region comparators 105 (suffixes omitted) are similar in structure and operation. The zeroth region comparator 105 (suffix 0 omitted) alone will be described among the zeroth through the (R−1)-th region comparators 105 and will be referred to merely as a region comparator.

In the region comparator 105, a zeroth region data memory 109 is preliminarily loaded with a zeroth information datum which is specific to the zeroth master and slave information region data. Zeroth master and slave region detectors 111 and 113 are supplied with the zeroth information datum in common and individually with the master phase data from the signal line 51 through the data demodulator 55 and with the slave phase data from the phase data producing circuit 41 of the slave drive. The master or the slave phase data comprise the zeroth through the (R−1)-th region data. When the zeroth region datum is detected, the master region detector 111 produces a zeroth master detection pulse. The slave region detector 113 produces a zeroth slave detection pulse.

From the clock generator 45, clock pulses of the clock signal are supplied to zeroth deceleration (DEC) and acceleration (ACC) suspend counters 115 and 117 in the manner indicated by labels CLK. The deceleration and the acceleration suspend counters 115 and 117 are normally put in an initial state of holding a count of zero and of producing zeroth deceleration and acceleration suspend signals with the high level (active). Only when a pertinent one of the master and the slave detection pulses is supplied, the suspend counter 115 or 117 begins to count the clock pulses up to a predetermined count M. In the meanwhile, the deceleration or the acceleration suspend signal is given the low level (inactive). The predetermined count is such that the second disk is given a half rotation while the counter 115 or 117 counts the clock pulses from zero to the predetermined count.

Zeroth deceleration and acceleration circuits 119 and 121 are similar in structure and likewise operable in an exclusive manner. In the deceleration circuit 119, a zeroth inverter 123 is supplied with the master detection pulse and produces a zeroth master inverted pulse. A zeroth deceleration three-input AND gate 125 is supplied with the deceleration suspend signal, the slave detection pulse, and the master inverted pulse and produces a zeroth primary deceleration AND output signal which will become clear as the description proceeds. Supplied with the master inverted pulse and a zeroth deceleration input signal which will presently be described, a zeroth two-input deceleration AND gate 127 produces a zeroth secondary deceleration AND output signal.

Through a zeroth deceleration OR gate 129, the primary or the secondary deceleration AND output signal is supplied to a data input D of a zeroth deceleration flip-flop 131, which has a clock input C supplied with the clock pulses CLK. The deceleration flip-flop 131 has a data output Q, through which the primary or the secondary deceleration AND output signal is clocked as a zeroth deceleration signal, which is used as the zeroth deceleration input signal.

The zeroth acceleration circuit 121 similarly produces a zeroth acceleration signal. The r-th region comparator 105(r) likewise produces r-th deceleration and acceleration signals.

In the output circuit 107, a deceleration output OR circuit 133 is supplied with the zeroth through the (R−1)-th deceleration signals and produces an overall deceleration signal. An acceleration output OR gate 135 produces an overall acceleration signal.

Figure 12:
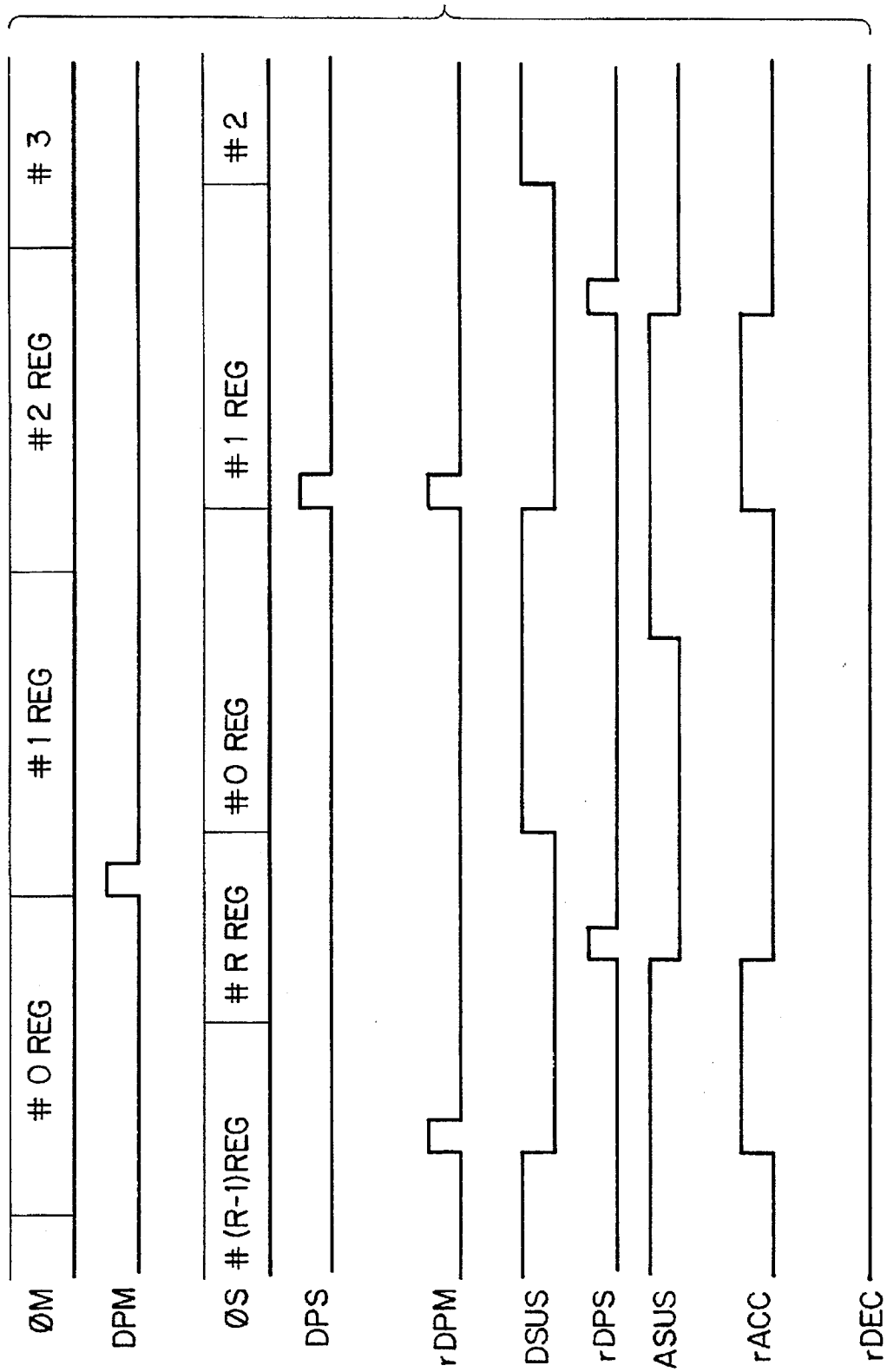
FIG. 12 is a time chart for use in describing operation of the comparator illustrated in FIG. 11.

Turning to FIG. 12 with FIG. 11 continually referred to, the master phase data are exemplified along a first or top row labelled φM with the zeroth and other master region data of the type used in FIG. 5. The zeroth master detection pulse is illustrated along a second row labelled DPM. The slave phase data are exemplified to include the zeroth slave region datum along a third row labelled φS. The zeroth slave detection pulse is depicted along a fourth row labelled DPS.

It will be presumed that the slave phase data lag behind the master phase data. In this event, r-th primary and secondary master detection pulses are illustrated along a fifth row which is again labelled rDPM. The r-th deceleration suspend signal is given the low level as depicted along a sixth row labelled DSUS. Depending on a phase lag, the r-th slave detection pulses are produced in the manner exemplified along a seventh row labelled rDPS. When the r-th primary master detection pulse is produced, an r-th acceleration signal remains in the high level as depicted along an eighth row labelled ASUS.

Under the circumstances, an r-th three-input AND gate of an r-th acceleration circuit produces an r-th primary AND output signal with the high level. As a consequence, the r-th acceleration signal is given the high level as shown along a ninth row labelled rACC. Being used as an r-th AND input signal, the r-th acceleration signal makes an r-th two-input AND gate of the r-th acceleration circuit produce an r-th secondary AND output signal with the high level. As a result, the r-th acceleration signal is kept in the high level even if the r-th primary AND output may be given the low level.

When the r-th slave detection pulse is produced in the manner exemplified along the seventh row, the r-th secondary AND output signal is given the low level. The r-th acceleration signal is therefore given the low level. In the meantime, an r-th deceleration signal is kept at the low level as shown along a tenth or bottom row labelled rDEC.

Figure 13:
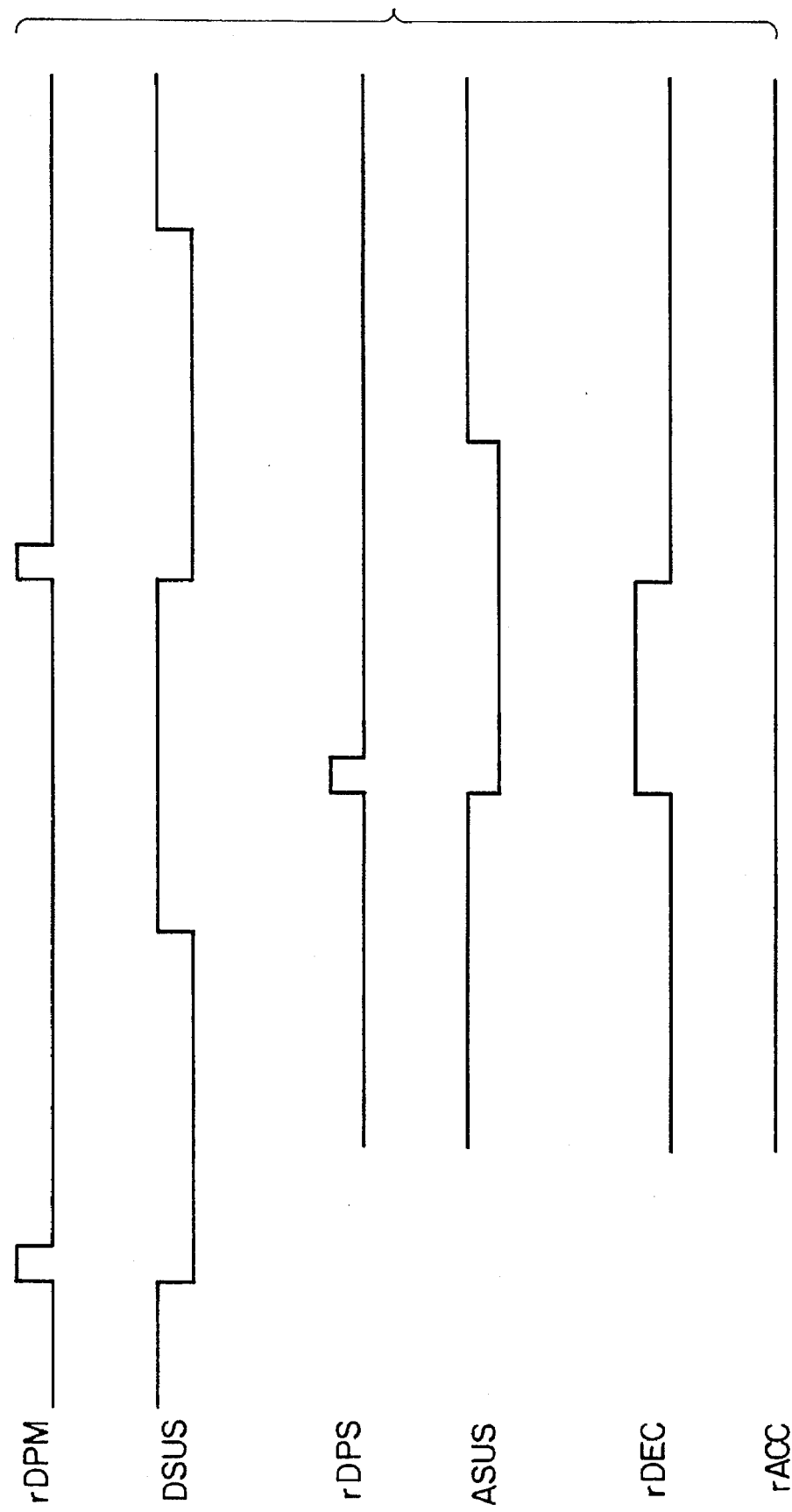
FIG. 13 is another time chart for use in describing operation of the comparator depicted in FIG. 11.

Further turning to FIG. 13 with FIG. 11 continuously referred to, it will be presumed that the slave phase data lead the master phase data. A phase lead is equivalent to the phase lag of greater than 180°. It is, however, preferred to decelerate the speed of rotation of the second disk or of the spindle in the presence of the phase lead. Acceleration and deceleration are discriminated from each other by the r-th acceleration and deceleration suspend signals.

The r-th primary and secondary master detection pulses are illustrated along a first or top row labelled rDPM. The r-th deceleration suspend signal is depicted along a second row labelled DSUS. It is assumed that the r-th slave detection pulse is produced as exemplified along a third row labelled rDPS. The r-th slave detection pulse is nearer to the r-th secondary master detection pulse than the r-th primary master detection pulse. This gives the low level to the r-th acceleration suspend signal in the manner depicted along a fourth row labelled ASUS.

When the r-th slave detection pulse is produced, no r-th master detection pulse is present. The r-th deceleration suspend signal is given the high level. As a consequence, the r-th three-input AND gate of the r-th deceleration circuit produces the r-th primary AND output signal with the high level. The r-th deceleration signal is therefore given the high level as shown in a fifth row labelled rDEC until the r-th secondary master detection pulse appears. The r-th deceleration signal is kept at the low level in the manner depicted along a sixth or bottom row labelled rACC.

Figure 14:
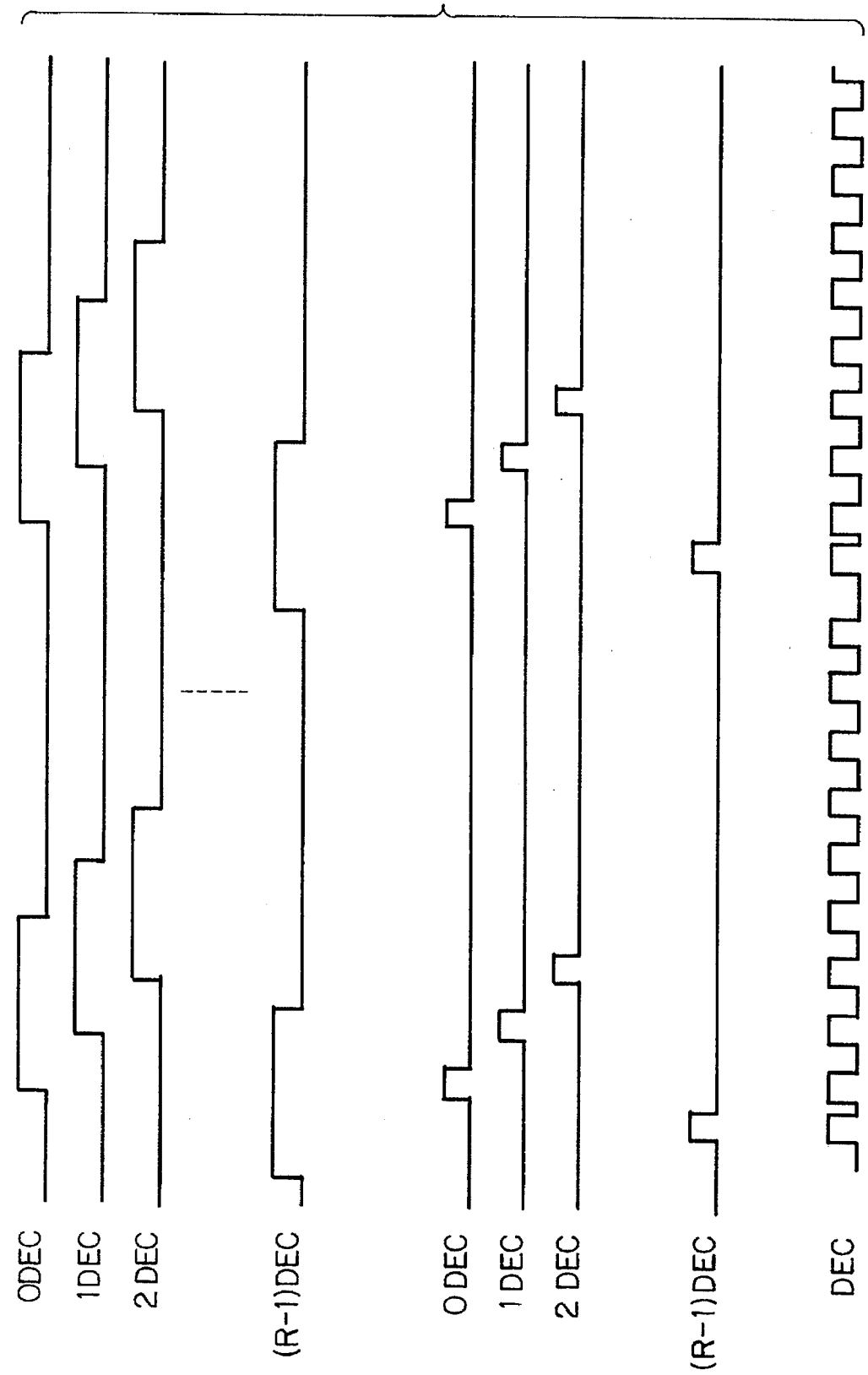
FIG. 14 is a still another time chart for use in describing operation of the comparator shown in FIG. 11.

Still further turning to FIG. 14 with FIG. 11 additionally referred to, it is first surmised that the zeroth, the first, . . . , and the (R–1)-th deceleration signals are produced with the high level in the manner exemplified along first through fourth rows labelled 0DEC, 1DEC, 2DEC, and (R–1)DEC. Through the deceleration OR gate 135, such deceleration signals are collectively produced as the overall deceleration signal, which is used as the control signal in decelerating the speed of rotation of the second disk.

It will now be surmised that the speed of rotation is decelerated so that the phase lag is rendered less than the predetermined region duration. In this event, the zeroth through the (R–1)-th deceleration signals become very short in the manner exemplified along fifth through eighth rows which are again labelled 0DEC to (R–1)DEC. The overall deceleration signal consists of deceleration pulses exemplified along a ninth or bottom row labelled DEC.

In FIG. 11, it will be presumed that the slave phase data are in correct synchronism with the master phase data. In this event, the zeroth through the (R–1)-th master and slave detection pulses are simultaneously produced. To speak of the zeroth region comparator 105(0), the zeroth inverter 123 and its counterpart in the zeroth accelerating circuit 121 prevents production of the zeroth accelerating and decelerating signals. This applies to other region comparators 105. The second disk or the spindle therefor is rotated at the predetermined speed of rotation.

Reviewing FIGS. 11 through 14, the comparator 43 produces the control signal which either accelerates or decelerates the speed of rotation of the second disk or the spindle therefor with a high rate while the phase lag or lead is great to result in a phase mismatch in a considerable part of the predetermined region duration. When the phase mismatch is reduced, the control signal either accelerates or decelerates the speed of rotation little by little.

If desired, an r-th region comparator 105(r) may comprise a p-th region data memory connected to the r-th master region detector and a q-th region data memory connected to the r-th slave region detector in order to achieve synchronism between the p-th master region datum and the q-th slave region datum. Taking the zeroth region comparator 105(0) into consideration, it is possible to understand that the p-th and the q-th region data memories are depicted as the zeroth region data memory 109.

The comparator 43 may comprise only a small number of region comparators. For example, the comparator 43 may comprise zeroth through S-th region comparators, where S represents a preselected integer which is not greater than the predetermined integer less one (R–1). Zeroth through the preselected integer should be selected from zero through (R–1). Among the zeroth through the S-th region comparators, an s-th region comparator is similar in structure to the r-th region comparator 105(r), where s is variable between zero and the preselected integer, both inclusive.

Again referring to FIG. 1, it is possible to use a delay circuit 137 between the servo demodulator 37 and the phase data producing circuit 41 and to make the delay circuit 137 give a selected delay to the slave index pulse. This enables to establish synchronism between the master phase data and the slave phase data with a preselected phase difference kept therebetween. It is furthermore possible to use an adjustable delay circuit.

Figure 15:
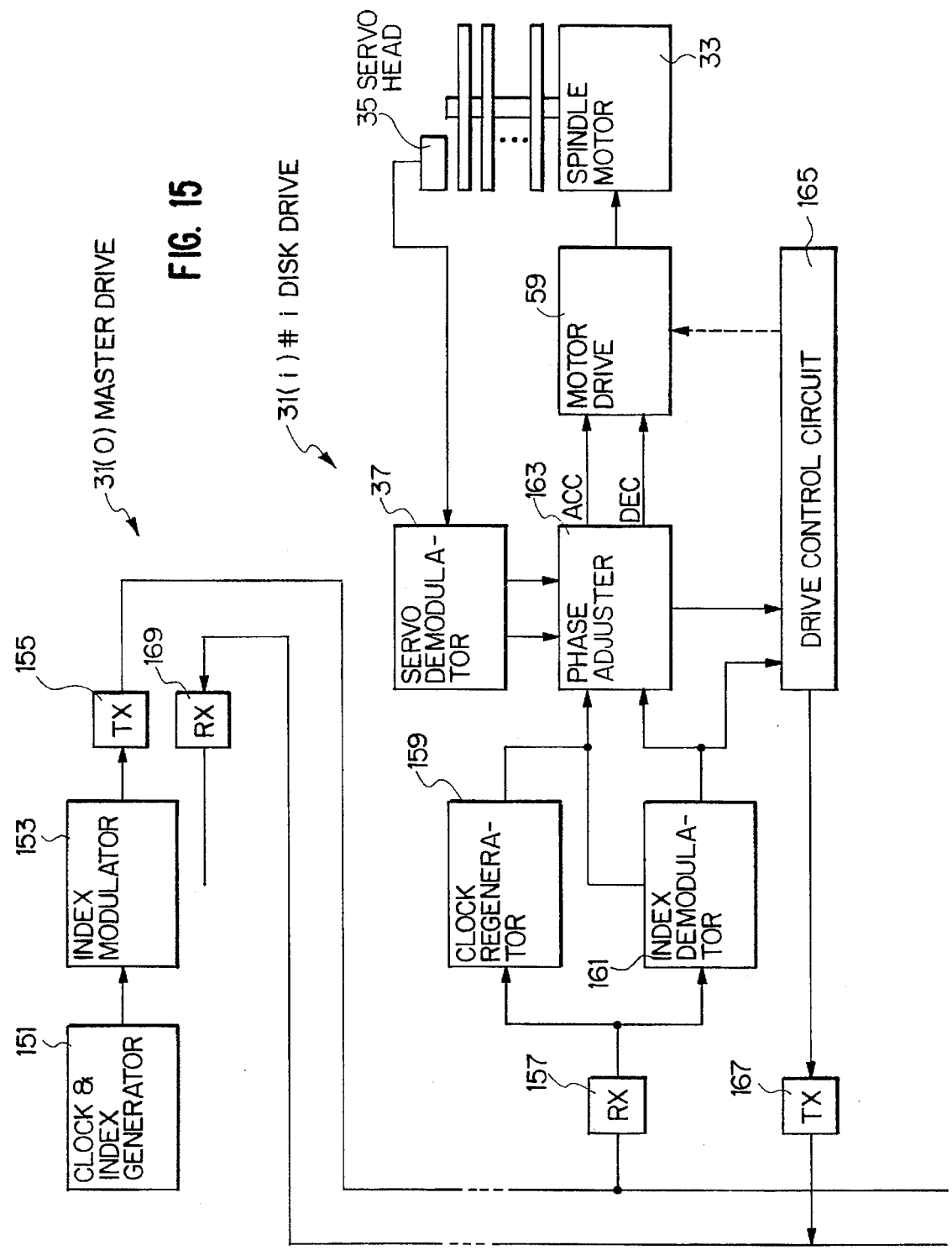
FIG. 15 is a block diagram of disk drives which comprise a synchronized spindle control device according to a second embodiment of this invention.

Referring now to FIG. 15, the description will proceed to a synchronous spindle control device according to a second embodiment of this invention. Although parts are described in a different manner in some respects, similar parts are designated by like reference numerals as far as possible. It will be assumed that the zeroth or #0 disk drive 31(0) is the master drive. The first through the I-th or #1 through #I disk drives 31(1) to 31(I) are slave drives. Among the slave drives 31 (suffixes 1 through I omitted), an i-th or #i disk drive 31(i) alone is depicted.

Although referred to as a disk drive, the master drive 31(0) comprises neither memory disks nor a spindle for driving such memory disks. Instead, a clock and index generator 151 generates a master reference pulse sequence of master reference pulses which are produced at N master bit positions predetermined in a predetermined time duration, where N represents a first prescribed integer which is not less than three. Typically, the master reference pulses are master clock pulses and will be referred to mainly as the master clock pulses. The master reference pulse sequence will accordingly be called a master clock sequence. The clock and index generator 151 furthermore generates a master index signal in the predetermined time duration. It is preferred that the master index signal has an index duration of M master bit positions, where M represents a second prescribed integer which is not less than one and is less than the first prescribed integer. The master index signal may alternatively be called a single master index signal. This is because the clock and index generator 151 may produce a succession of master index signals in the predetermined time duration. In such an event, it is possible to select one of the master index signals of the succession as the single master index signal.

Supplied with the master clock sequence and the master index signal, an index signal modulator 153 produces a master composite pulse sequence of master composite pulses which are positioned at the N master bit positions except for a predetermined at least one of the N master bit positions. It is readily possible to produce the master composite pulse sequence by using the master index signal in gating the master clock pulses. The master composite pulse sequence is delivered by a master transmitter (TX) 155 towards the slave drives 31 through the signal line 51 which is now depicted as comprising a down signal line directed from the master drive 31(0) to the slave drives 31 and an up signal line inversely directed.

It is now understood that the master composite pulse sequence comprises an index code pattern and a reference clock pattern, which is defined by a predetermined part of the master clock sequence. The predetermined part has a partial time duration of (N−M) master bit positions. When the index duration is M master bit positions long, the partial time duration is equal to the predetermined time duration less the index duration. The index code pattern is defined by a partial composite pulse sequence of master composite pulses which are produced at (M−1) selected positions selected from the N master bit positions. In an extreme case where the second prescribed integer is equal to one, the index code pattern comprises no pulses.

A combination of the clock and index generator 151, the index signal modulator 153, and the master transmitter 155 serves as a master phase data producing arrangement for producing a master phase datum representative of a master phase. According to the foregoing, the master phase datum comprises the index code pattern and the reference clock pattern collectively as N primary phase data.

Alternatively, the master reference pulse sequence and the master index signal can be used as the N primary phase data. In this event, the index signal modulator 153 is not used. Instead, the master reference pulse sequence and the master index signals are supplied directly to the master transmitter 155. As a result, another combination of the clock and index generator 151 and the master transmitter 155 serves as the master phase data producing arrangement.

In the manner described in conjunction with FIG. 1, the i-th disk drive 31(i) comprises the i-th spindle which drives information memory disks and is rotated by an i-th spindle motor 33 controlled by the motor drive circuit 59. Connected to the servo head 35 coupled to the i-th spindle through one of the memory disks that is called the "second" disk in connection with FIG. 1, the servo demodulator 37 produces the slave index pulse.

Although named like in FIG. 1, the servo demodulator 37 generates a slave reference pulse sequence of slave reference pulses at N slave bit positions during one rotation of the slave spindle. Typically, the slave reference pulses are slave clock pulses and will mainly be so called hereunder. The slave reference pulse sequence will consequently be called a slave clock sequence. It is readily possible to generate the slave clock sequence by triggering a clock generator (not shown) by the slave index signal.

A combination of the servo head 35 and the servo demodulator 37 serves as a slave phase data producing arrangement. Coupled to the slave spindle, the slave phase data producing arrangement (35, 37) produces a slave phase datum representative of a slave phase of rotation of the slave spindle. During one rotation of the slave spindle, the slave phase datum comprises the N slave clock pulses and the slave index signal collectively as N secondary phase data.

Through the down signal line, the N primary phase data are delivered to the slave drives 31. In the i-th disk drive 31(i), a slave receiver (RX) 157 receives the N primary phase data as N received phase data. More particularly, the N received phase data are represented either by the master composite pulse sequence received as a received composite pulse sequence or a combination of the index code pattern and the reference clock pattern which are received as a received code pattern and a received clock pattern.

Supplied with the received phase data, a clock regenerator 159 regenerates the master clock sequence as a received or regenerated clock sequence. Regeneration is possible from whichever of the received composite pulse sequence or a combination of the received code pattern and the received clock pattern. The received clock sequence consists of received clock or reference pulses which are substantially identical with the master clock pulses.

Supplied with the received phase data and the received clock sequence, an index signal demodulator 161 reproduces the master index signal as a received index signal. The N received phase data are thereby represented by a combination of the received clock sequence and the received index signal. The received index signal represents the master phase.

A combination of the slave receiver 157, the clock regenerator 159, and the index signal demodulator 161 serves as a phase data receiving arrangement. Supplied with the N primary phase data, the phase data receiving arrangement (157, 159, 161) produces the received clock sequence and the received index signal as the N received phase data.

Supplied with the slave clock sequence and the slave index pulse as the N secondary phase data from the servo demodulator 37 and with the received clock sequence and the received index signal, a phase adjust signal producing circuit 163 either activates an acceleration signal ACC or a deceleration signal DEC or keeps the acceleration and the deceleration signals inactive. Inasmuch as either only one is activated or both are kept inactive, the acceleration and the deceleration signals are collectively called a control signal.

More particularly, a drive control circuit 165 is supplied with the received index signal and produces a timing signal indicative of start of each predetermined time duration. Supplied with the timing signal, the phase adjust signal producing circuit 163 is operable as a comparator for comparing the N secondary phase data with the N received phase data to detect a phase difference between the master and the slave phases and to produce the control signal in accordance with the phase difference. A combination of the phase adjust signal producing circuit 163 and the above-described part of the drive control circuit 165 serves as a comparing arrangement.

As the control signal, the accelerating signal is activated when the slave phase lags behind the master phase. The deceleration signal is activated when the slave phase leads the master phase. Neither the acceleration signal nor the deceleration signal is activated when the slave phase is in synchronism with the master phase and consequently when the slave phase data are completely coincident with the received or the primary phase data.

The control signal is supplied to the motor drive circuit 59. While activated, the acceleration signal accelerates the spindle motor 33 to accelerate a speed of rotation of the slave spindle. While the deceleration signal is activated, the motor drive circuit 59 decelerates the speed of rotation. Either if the slave phase is brought into synchronism with the master phase or if the slave and the master phases are in synchronism when the phase difference is taken into consideration, the slave phase data are coincident with the primary phase data. In this event, the acceleration and the deceleration signals are both inactive. The motor drive circuit 59 makes the spindle motor 33 rotate the slave spindle at a constant or a predetermined speed of rotation.

While the acceleration and the deceleration signals are left inactive, the phase adjust signal producing circuit 163 makes the drive control circuit 165 produce a slave status signal in an inactive state to indicate that the slave phase is kept in synchronism with the master phase. While activating either the acceleration or the deceleration signal, the phase adjust signal producing circuit 163 may make the drive control circuit 165 produce the slave status signal in an active state of indicating out of synchronism.

Through a slave transmitter 167, the slave status signal is delivered to the up signal line. Through a wired OR gate of the up signal line, such slave status signals of the slave drives 31 are supplied to the master drive 31(0), where a master receiver 169 produces a master status signal which may be switched from an active state to an inactive state when all slave status signals are in the inactive state.

It is possible to give a common structure to the master drive and the slave drives 31 and to use an optional one of the zeroth through the I-th disk drives 31(0) to 31(I) as the master drive. Under the circumstances, the drive control circuit 165 should supply the drive control circuit 59 with a synchronization executing signal of the type described with reference to FIG. 1. Either the motor drive circuit 59 alone or a combination of the motor drive circuit 59 and the last-mentioned part of the drive control circuit 165 serves as a control arrangement.

Figure 16:
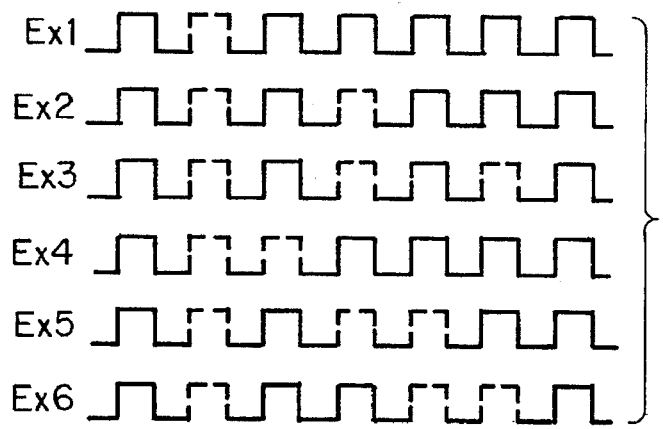
FIG. 16 is a time chart for use in describing examples of an index code pattern which is used in the synchronized spindle control device illustrated in FIG. 15.

Turning to FIG. 16, six index code patterns are exemplified as first through sixth examples in the manner depicted along a first or top row through a sixth or bottom row labelled Ex1, Ex2, Ex3, Ex4, Ex5, and Ex6. In each example, the master bit positions are exemplified at a predetermined clock period. The second prescribed number is equal to seven. The master bit positions are illustrated as solid-line pulses. The selected positions are shown as dashed-line pulses.

Figure 17:
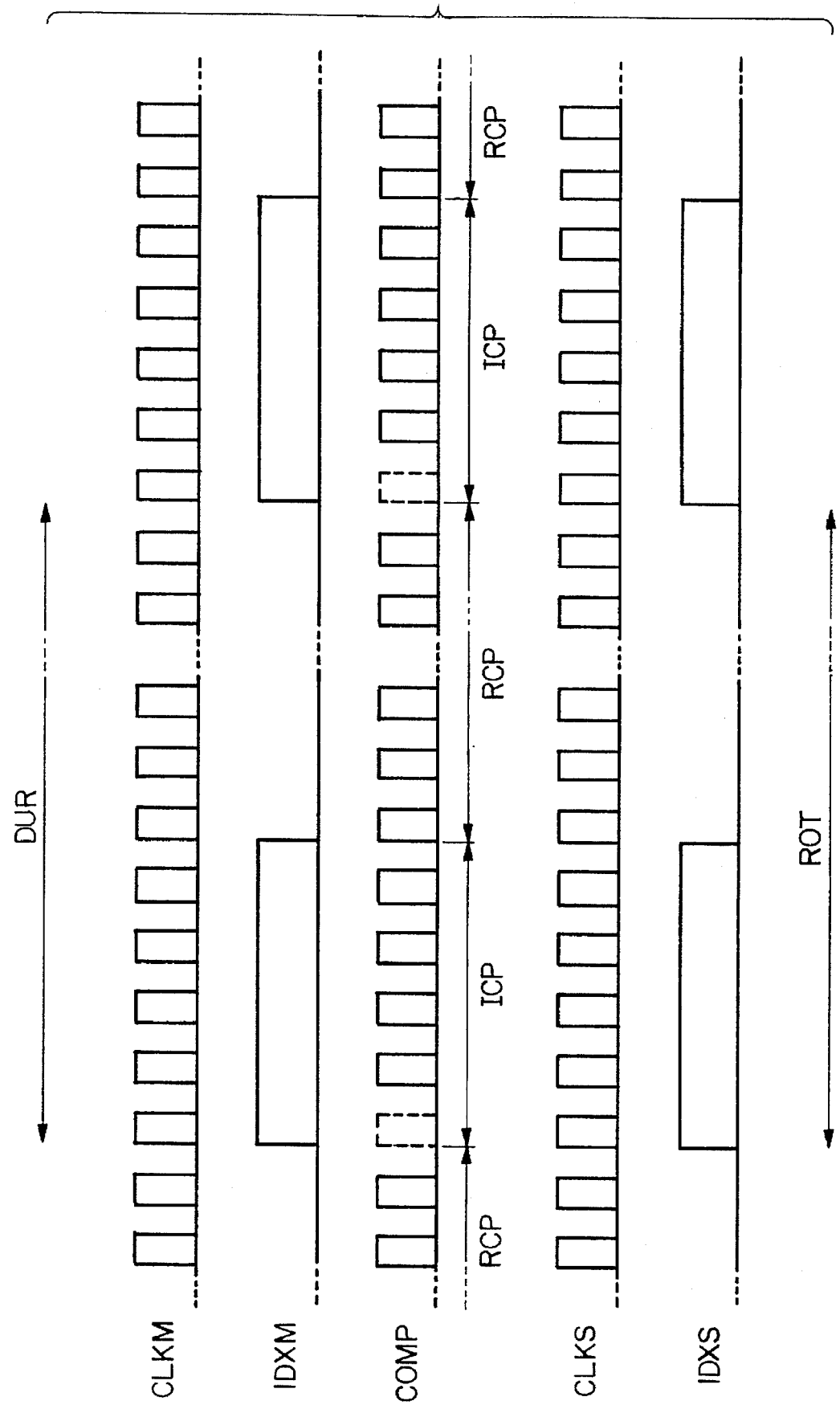
FIG. 17 is a time chart for use in describing operation of the synchronized spindle control device being illustrated.

Further turning to FIG. 17, the master clock sequence is illustrated along a first or top row labelled CLKM with the predetermined time duration indicated by a legend DUR. Two master index signals are exemplified along a second row labelled IDXM. The second prescribed number M is equal to five. In the illustrated example, the clock period is equal to an integral multiple of the predetermined time duration although this is not always necessary. The master composite pulse sequence is depicted along a third row labelled COPM. In the N primary phase data represented by the master composite pulse sequence, the index code pattern is given according to the first example described with reference to FIG. 16 and is indicated by a legend ICP. Other master clock pulses, (N–M) in number, give the reference clock pattern indicated at RCP.

The slave clock sequence is illustrated along a fourth row labelled CLKS. It is surmised that the slave clock sequence is in synchronism with the master clock sequence. Two slave index signals are exemplified along a fifth or bottom row labelled IDXS with one rotation of the slave spindle exemplified by a legend ROT. It is assumed that the slave phase is in synchronism with the master phase. Each slave index signal is M master bit positions long.

Figure 18:
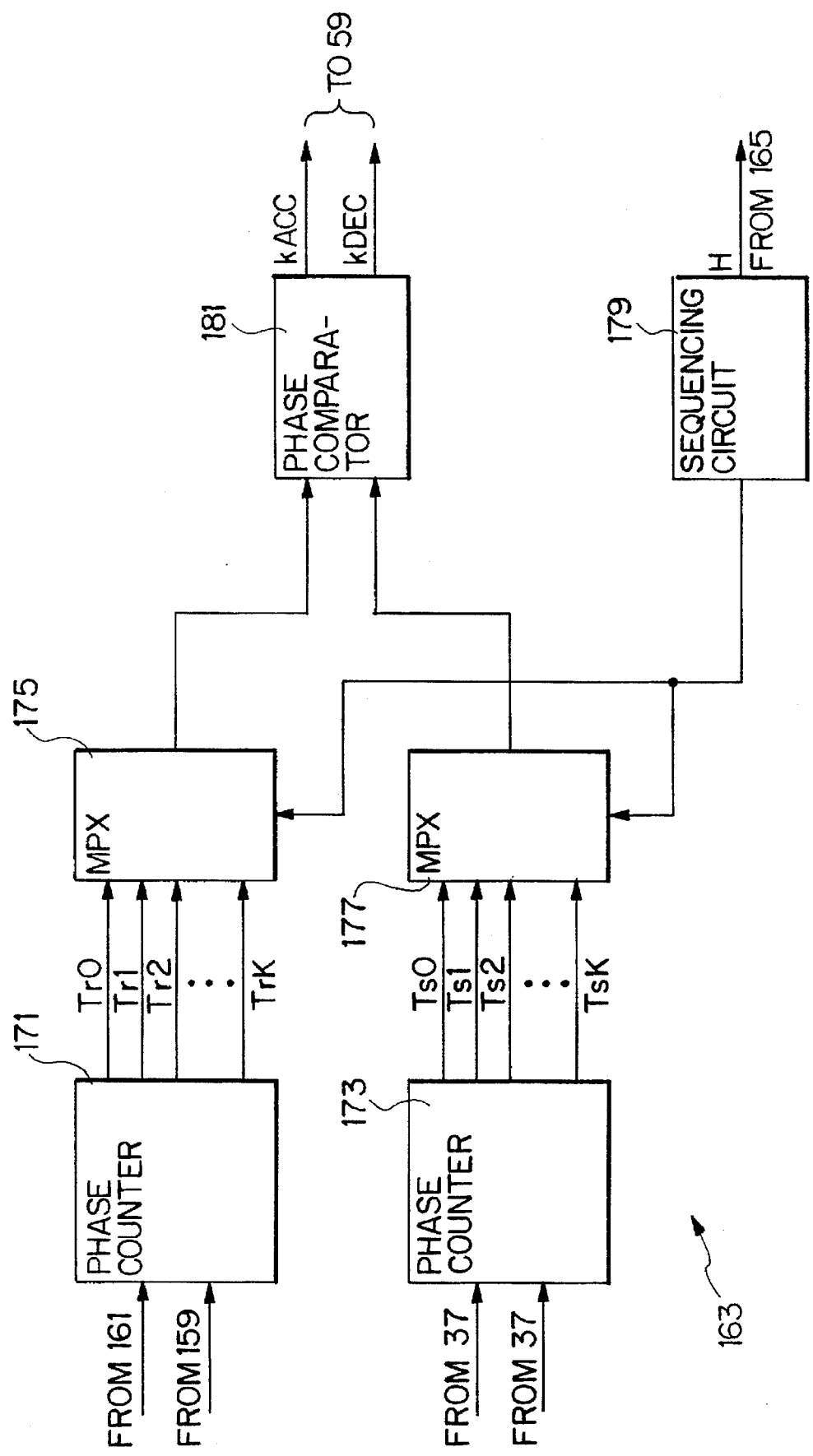
FIG. 18 is a block diagram of a phase adjust signal producing circuit for use in the synchronized spindle control device being illustrated.

Referring to FIG. 18 with FIG. 15 additionally referred to, the phase adjust signal producing circuit 163 comprises reference and slave phase counters 171 and 173. The reference phase counter 171 is supplied with the received clock sequence from the clock regenerator 159 and with the received index signal from the index signal demodulator 161 and produces zeroth and first through K-th reference pulse sequences Tr0 and Tr1 to TrK, where K represents a third prescribed integer which may be empirically determined and is equal, for example, to ten. The slave phase counter 173 is supplied with the slave clock sequence and with the slave index signal from the servo demodulator 37 and produces zeroth and first through K-th slave pulse sequences Ts0 and Ts1 to TsK.

The reference and the slave phase counters 171 and 173 are similar in structure and operation. It is therefore possible to say that a phase counter 171 or 173 is supplied with a clock sequence of clock pulses and with an index signal and produces a zeroth and a k-th phase pulse sequence T0 and Tk, where k is consecutively variable from one to the third predetermined number, both inclusive, and herein called a k-th count stage number. The index signal resets the phase counter 171 or 173 to an initial count.

On producing the zeroth phase pulse sequence T0, a half of the first prescribed integer N is used as a zeroth count. Counting from the initial count to a sum of the initial count plus the zeroth count, the phase counter produces a single phase pulse either in the predetermined time duration or during the rotation of the slave spindle as the zeroth phase pulse sequence. For production of the k-th phase pulse sequence, a k-th count is defined by a quotient of the first prescribed integer divided by a product of the k-th count stage number and a predetermined frequency multiplication factor F which is equal or greater than two and is typically equal to either two or three. The phase counter 171 or 173 counts the clock pulses from the initial count to a sum of the initial count plus the k-th count to produce kF phase pulses either in the predetermined time duration or during one rotation of the slave spindle as the k-th phase pulse sequence.

Figure 19:
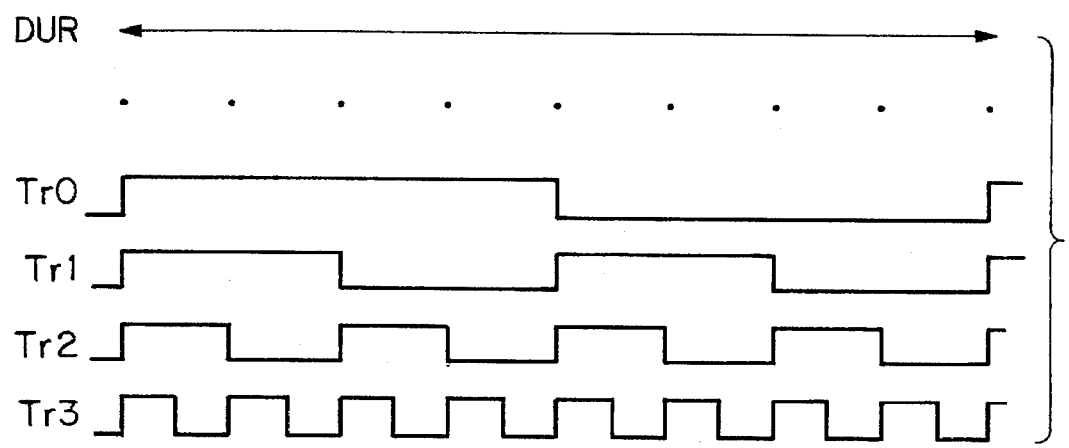
FIG. 19 is a time chart for use in describing reference pulse sequences which are preferably used in the phase adjust signal producing circuit depicted in FIG. 18.

Turning to FIG. 19 with FIG. 18 continuously referred to, the frequency multiplication factor F is equal to two. It will be said in this event that the phase counter 171 or 173 is operable in a "mode two" operation. The reference phase counter 171 will be taken into consideration. The predetermined time duration is illustrated along a first or top row labelled DUR with points shown below to divide the predetermined time duration into eight equal parts.

The zeroth reference pulse sequence is depicted along a second row labelled Tr0. The first reference pulse sequence is shown along a third row labelled Tr1 The second and the third reference pulse sequences are illustrated along a fourth row labelled Tr2 and along a fifth or bottom row labelled Tr3. The k-th reference pulse sequence Trk has a reference pulse repetition period which is equal to the predetermined time duration divided by the product of the k-th count stage number and the frequency multiplication factor.

Figure 20:
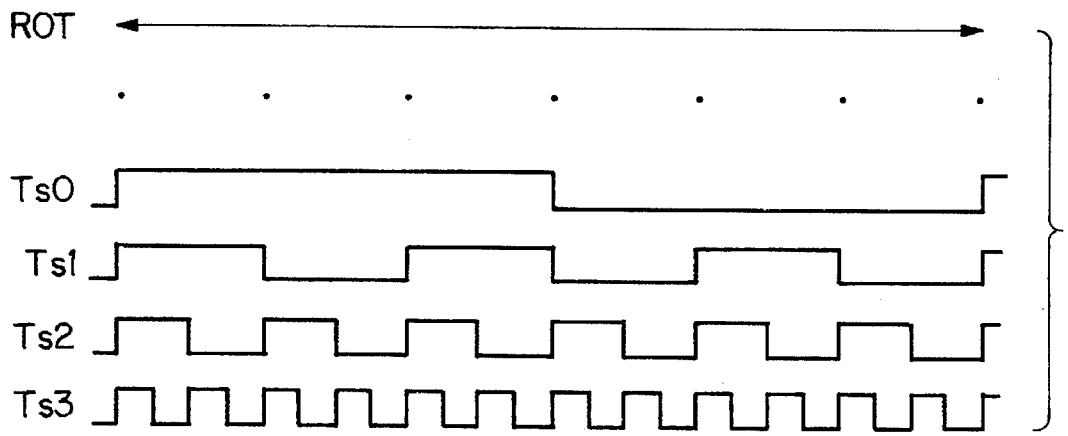
FIG. 20 is a time chart illustrative of slave pulse sequences which are preferably used in the phase adjust signal producing circuit mentioned in connection with FIG. 19.

Further turning to FIG. 20 with FIG. 18 continually referred to, the frequency multiplication factor F is now equal to three. The phase counter 171 or 173 is in a "mode three" operation. Attention will be directed to the slave phase counter 173. A time interval for one rotation of the slave spindle is illustrated along a first or top row labelled ROT with points shown below to equally divide the time interval into six parts.

The zeroth slave pulse sequence is depicted along a second row labelled Ts0 and is identical with the zeroth reference pulse sequence if the slave phase is in synchronism with the master phase so that the time interval of one rotation of the slave spindle is equal to the predetermined time duration. The first and the second slave pulse sequences are shown along third and fourth rows labelled Ts1 and Ts2. The third slave pulse sequence is illustrated along a fifth or bottom row labelled Ts3. The k-th slave pulse sequence has a slave pulse repetition period which is equal to the time interval of one rotation of the slave spindle over the product of the k-th count stage number and the frequency multiplication factor.

Reviewing FIGS. 19 and 20, the "mode three" operation is preferred when the spindle motor 33 (FIG. 1 or 15) comprises poles which are equal in number to an integral multiple of three. This is because the "mode three" operation makes it easy to attain stable feedback of the phase difference to the spindle motor 33 in such an event. It should be noted that three first slave repetition periods immediately follows a zeroth slave pulse repetition period.

Turning back to FIG. 18 with review of FIGS. 19 and 20 continued, the zeroth through the K-th reference pulse sequences Tr0 to TrK are supplied to a reference multiplexer or reference pulse selector 175 in parallel. The zeroth through the K-th slave pulse sequences are supplied to a slave multiplexer or slave pulse selector 177. Having the zeroth and the first through the K-th reference pulse repetition periods, the zeroth and the first through the K-th reference pulse sequences can be understood to have predetermined reference sequence positions in the predetermined time duration. It is likewise possible to understand that the zeroth and the first through the K-th slave pulse sequences have predetermined slave sequence positions also in the predetermined time duration.

Supplied from the drive control circuit 165 (FIG. 15) with the timing signal which is now indicated by H, a sequencing circuit 179 successively produces zeroth and first through K-th sequencing pulse sequences. In the predetermined time duration specified by the timing signal, the zeroth sequencing pulse sequence has one zeroth sequencing pulse alone. The k-th sequencing pulse sequence has k-th sequencing pulses, equal in number to the product of the k-th count stage number k and the frequency multiplication factor F.

Controlled by the zeroth sequencing pulse, the reference and the slave pulse selectors 175 and 177 select, for supply to a phase comparator 181, one zeroth reference phase pulse of the zeroth reference pulse sequence as one zeroth selected reference pulse and one zeroth slave phase pulse of the zeroth slave pulse sequence as one zeroth selected slave pulse. Responsive to the k-th sequencing pulses, the reference and the slave pulse selectors 175 and 177 select kF k-th reference phase pulses of the k-th reference pulse sequence as kF k-th selected reference pulses and kF k-th slave phase pulses of the k-th slave pulse sequence as kF k-th selected slave pulses.

Referring to FIG. 21 with FIGS. 15 and 18 through 20 again referred to, operation will be described mainly with regard to the phase adjust signal producing circuit 163 and specifically with respect to the phase comparator 181. A succession of zeroth through K-th predetermined time durations #0, #1, #2, ..., and #K is illustrated along a first or top row labelled DUR. The zeroth through the K-th reference pulse sequences are exemplified along a second row labelled Trk. The zeroth through the K-th slave pulse sequences are exemplified along a third row labelled Tsk.

It is surmised that the zeroth slave pulse sequence lags behind the zeroth reference pulse sequence. The phase comparator 181 compares the one zeroth selected slave pulse with the one zeroth selected reference pulses, namely, the single zeroth reference phase pulse and the single zeroth slave phase pulse. Detecting a zeroth phase difference at each of leading and trailing edges of the zeroth reference and the slave phase pulses, the phase comparator 181 produces two zeroth acceleration pulses in the manner exemplified along a fourth row labelled kACC. The spindle motor 33 is accelerated.

As a consequence, the first slave pulse sequence may lead the first reference pulse sequence. Detecting component phase difference collectively as a first phase difference, the phase comparator 181 produces a plurality of first deceleration pulses as exemplified along a fifth row labelled kDEC. It may be mentioned here that an acceleration pulse can be understood as a positive acceleration pulse and a deceleration pulse, as a negative acceleration pulse. At any rate, the speed of rotation of the slave spindle is either accelerated or decelerated, towards synchronism with the master phase.

In the manner depicted on an enlarged scale along a sixth or bottom row labelled Trk/Tsk as regards the "mode two" operation, the second slave pulse sequence lags in general behind the second reference pulse sequence. More particularly, a first one of four second slave phase pulses lags behind a first one of four second reference phase pulses. This applies to second and third ones of the second slave and reference phase pulses. It will be seen that a phase lag of between the four second reference phase pulses and the four second slave phase pulses monotonously decreases from the first ones to the fourth ones. In the example being illustrated, the fourth ones have no phase difference, namely, neither a phase lead nor a phase lag. At any rate, such phase leads or lags may collectively be called a second phase difference. In the manner exemplified along the fourth row labelled kACC, second acceleration pulses have pulse durations which diminishes into zero.

Consequently neither the acceleration pulses nor the deceleration pulses are depicted in the K-th predetermined time duration. It is now appreciated that use of the zeroth through the K-th phase pulse sequences makes it possible to synchronize the slave phase smoothly to the master phase. When no acceleration or deceleration pulse is supplied to the motor drive circuit 59, the slave spindle is kept in rotation at the predetermined speed of rotation. The slave phase of rotation of the slave spindle is brought into and kept in complete synchronism with the master phase.

When the spindle motor 33 is put into rotation in one of the slave drives, the slave phase may have a great phase difference relative to the master phase. In such an event, the sequencing circuit 179 is preferably controlled by the timing signal to produce the zeroth sequencing pulse sequence during a plurality of predetermined time durations. Conversely, the sequencing circuit 179 may be controlled to produce no zeroth sequencing pulse sequence after the slave phase is once brought into synchronism with the master phase. If such control should automatically be carried out, it is possible to detect a time duration of the accelerating or the decelerating pulse and to use the time duration in controlling the sequencing circuit 179.

Reviewing FIGS. 15 and 18, it is possible to understand that a combination of the clock regenerator 159, the index pulse demodulator 161, the phase adjust signal producing circuit 163, and the drive control circuit 165 as a comparing arrangement for comparing the slave and the received reference pulses and the slave and the received index signals to detect a phase difference between the master and the slave phases and to produce the control signal for controlling the slave phase. A timing signal producing circuit is implemented by a part of the drive control circuit 165 that is supplied with the received index signal and produces the timing signal. The reference and the slave pulse selectors 175 and 177, the sequencing circuit 179, and the phase comparator 181 may collectively be understood as a comparator. The timing signal producing circuit and the comparator (175–181) may collectively be understood as a phase comparing arrangement. In this event, the comparing arrangement (159–165) comprises the clock regenerator 159, the index signal demodulator 161, and the phase comparing arrangement.

Figure 22:
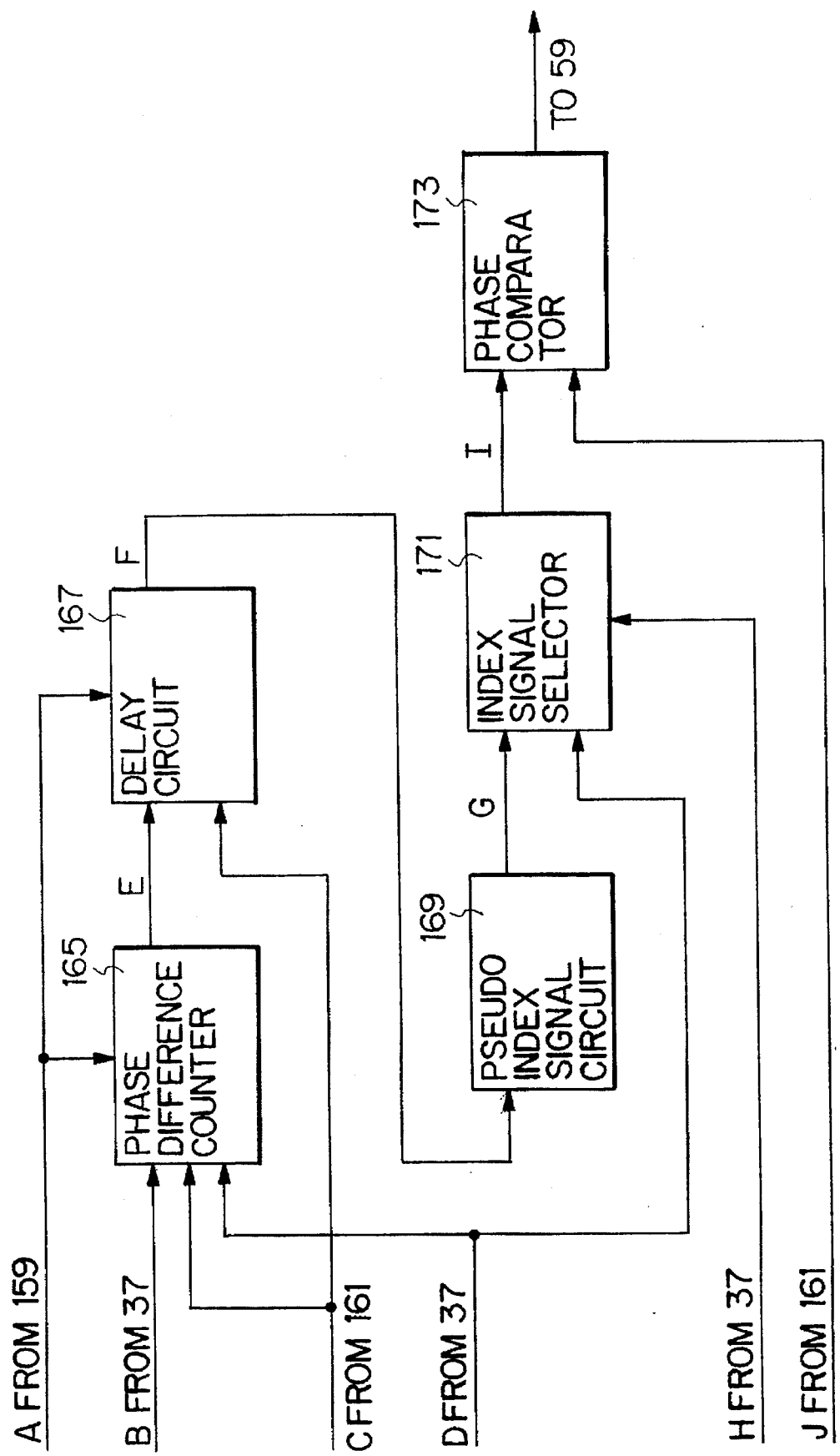
FIG. 22 is a block diagram of a trouble processing circuit for use in the synchronized spindle control device mentioned in connection with whichever of FIGS. 1 and 15.

Referring now to FIG. 22, attention will be directed to a trouble processing circuit for use in a slave drive, such as the #i disk drive 31(i) described in conjunction with FIGS. 1 and 15. The trouble processing circuit is a part of the synchronized spindle control device of the type described in the foregoing. Merely by way of example, the trouble processing circuit will be described with additional reference to FIG. 15. It is possible in this event to understand that the trouble processing circuit is included in the phase adjust signal producing circuit 163 and is so indicated in FIG. 22.

Relative to the trouble processing circuit, the servo head 35, the servo demodulator 37, the spindle with the memory disks, the slave receiver 153, the clock regenerator 159, and the index signal demodulator 161 with collectively be referred to as a higher hierarchy circuit, which may or may not include that part of the drive control circuit 165 which produces the synchronization executing signal. The motor drive circuit 59 and the spindle motor 33 are collectively called a lower hierarchy circuit. In FIG. 1, the higher hierarchy circuit includes the phase data producing circuit 41, the clock generator 45, the signal detector 53, and the data demodulator 55 and may or may not include the delay circuit 137. The lower hierarchy circuit includes the intermediate gate 57.

The slave status signal of the drive control circuit 165 will now be called a servo control signal. While the spindle motor 33 rotates the spindle at the constant speed of rotation and is either accelerated or decelerated, the servo control signal is rendered inactive and active. It is possible to make in FIG. 15 the servo demodulator 37 and to make in FIG. 1 the phase data producing circuit 41 produce the servo control signal by monitoring whether or not the slave index signal is produced with a predetermined repetition period. It is now understood that the servo control signal is what is often called a servo PLO good signal in the art.

It may here be pointed out in connection with the trouble processing circuit that the higher hierarchy circuit stops or suspend production of the slave index signal in a conventional synchronized spindle control device of a kind while the slave phase is in phase synchronism with the master phase to inactivate the servo control signal. During free rotation of the spindle motor 33 at the constant speed of rotation while no slave index signal is produced, the slave phase may be disturbed by a sudden and unexpected variation in the speed of rotation of the spindle motor 33. In such an event, the phase synchronism between the master and the slave phases is upset and can not be recovered or restored because no slave index signal is produced.

In the trouble processing circuit, a phase difference counter 165 is supplied from the higher hierarchy circuit with a reference clock signal A of reference clock pulses. In FIG. 15, the reference clock signal is the received clock sequence produced by the clock regenerator 159. In FIG. 1, the reference clock signal is the clock signal generated by the clock generator 45. When the servo control signal is activated, the servo demodulator 37 of FIG. 15 or the phase data producing circuit 41 of FIG. 1 activates a count enable signal B, which is inactivated when the servo control signal becomes inactive. While the count enable signal is active, the phase difference counter 165 counts the reference clock pulses to provide a reference clock count.

The phase difference counter 165 is furthermore supplied from the higher hierarchy circuit with a master index signal C and a slave index signal D. In FIG. 15, the master index signal is the received index signal produced by the index demodulator 161. When the #i disk drive 31(i) is used in FIG. 1 as one of the slave drives, the master index signal is produced by the data demodulator 55 as at least one of the N primary or demodulated phase data, such as a predetermined at least one of the zeroth through the (R−1)-th region data. The slave index signal is produced in FIG. 15 by the servo demodulator 37 and in FIG. 1 by the phase data producing circuit 41 for supply to the comparator 43 as a preselected at least one of the zeroth through the (R−1)-th region data of the N secondary phase data.

Incidentally, a combination of the received index signal and the received clock or reference sequence serves in FIG. 15 as a master phase signal representative of the master phase. In FIG. 1, the N primary phase data are used as the master phase signal. The master and the slave phase signals and the master index signal are often referred to in the art as master and slave sink signals and as a hole signal.

Counting the reference clock count from appearance of the master phase signal until occurrence of the slave index signal to provide a phase difference count, the phase difference counter 165 produces an index phase difference signal E representative of the phase difference count as an index phase difference which the slave index signal has relative to the master index signal, namely, which the slave phase has relative to the master phase. While the servo control signal is active, the phase difference count may vary to a current difference count from an initial difference count obtained first after the count enable signal is activated.

A phase difference signal delay circuit 167 is supplied with the reference clock signal A and the master index signal C and is controlled by the phase difference signal E. Controlled by the phase difference signal to count the reference clock pulses from zero to the phase difference count, the delay circuit 167 produces a delayed index signal F by giving the master index signal a delay which is equal to the phase difference count.

A pseudo index signal producing circuit 169 is supplied with the delayed index signal. It will be presumed that the master and the delayed index signals C and F have their leading edges, when the phase difference signal counter 165 begins to count the phase difference count and when the delay circuit 167 begins to count the reference clock pulses. Detecting the leading edge of the delayed index signal, the pseudo index signal producing circuit 169 begins to produce a pseudo index signal G which has an index duration of each slave index signal. Being produced with the master index signal C given the delay of the phase difference count which the slave index signal D has relative to the master index signal and may depend on the speed of rotation of the slave spindle, such pseudo index signals are substantially in phase coincidence with the slave index signals produced while the servo control signal is active.

When the servo control signal is inactivated to inactivate the count enable signal B, the phase difference counter 165 keeps the current difference count at which the phase difference count arrives when the count enable signal becomes inactive. The pseudo index signal producing circuit 169 consequently continues production of the pseudo index signal G with its phase substantially coincident with the slave index signal which is last produced before the speed of rotation of the slave spindle arrives at the predetermined speed of rotation to inactivate the servo control signal.

An index signal selector 171 is supplied with the slave index signal D and the pseudo index signal G and is controlled by the servo control signal which is now indicated by H. While the servo control signal is active, the index signal selector 171 selects the slave index signal as a selected index signal I. After the servo control signal is inactivated until the servo control signal is later activated for some reason or another, no slave index signal is produced. Under the circumstances, the index signal selector 171 selects the pseudo index signal as the selected index signal. It is therefore possible to make the index signal selector 171 produce the pseudo index signal in place of the slave index signal even while the servo control signal is inactive to actually produce no slave index signal.

An index phase comparator 173 is supplied with the selected index signal I and from the higher hierarchy circuit with the master phase signal which is now indicated at J. Comparing the selected index signal with the master phase signal as regards their phases, the index phase comparator 173 detects a signal phase difference of the selected index signal relative to the master phase signal and produces an improved control signal in accordance with the signal phase difference. Supplied to the lower hierarchy circuit, the improved control signal either keeps the slave phase in synchronism with the master phase or accelerates or decelerates the spindle motor 33.

It is now understood that the index phase comparator 173 may be the phase adjust signal producing circuit 163 illustrated with reference to FIG. 18. The improved control signal is delivered in this event to the motor drive circuit 59. Alternatively, the index phase comparator 173 may be the comparator 43 illustrated with reference to either FIG. 6 or FIG. 11. In such an event, the improved control signal is delivered to the motor drive circuit 59 through the intermediate gate 57.

In the manner described above, the servo control signal H is kept and rendered inactive while the slave phase is in phase synchronism with the master phase and when the slave phase is brought into phase synchronism with the master phase. The improved control signal either keeps the slave phase coincident with the master phase or adjusts the slave phase into coincidence with the master phase irrespective of whether the servo control signal is active or inactive. Should the slave phase be unexpectedly brought out of synchronism with the master phase, the improved control signal can restore the phase synchronism with selection as the selected index signal I of the slave index signal D which begins to be produced as soon as the slave phase becomes out of synchronism with the master phase to activate the servo control signal.

While this invention has thus far been described in specific conjunction with a few preferred embodiments thereof and some modifications, it will now be readily possible for one skilled in the art to put this invention into practice in various other manners. Above all, this invention is applicable to restoration and maintenance of synchronization of a frame synchronization signal which is used in various fields of electric and optical communication. The first or the master phase should therefore be understood in appended claims to mean a reference phase to which the frame synchronization signal should be kept and brought into synchronism.

What is claimed is:

1. A device for synchronously rotating first and second spindles driving first and second disks, said device comprising:

first phase data producing means coupled to said first disk for producing N primary phase data representative of a first phase of rotation during one rotation of said first disk, where N represents an integer which is not less than two;

rotating means for controllably rotating said second spindle;

second phase data producing means coupled to said second disk for producing N secondary phase data representative of a second phase of rotation during one rotation of said second disk;

comparing means for comparing said primary and said secondary phase data to detect a phase difference between said first and said second phases and to produce a control signal in accordance with said phase difference; and control means for controlling said rotating means by said control signal.

2. A device as claimed in claim 1, wherein:

said N primary phase data comprises (R+1) primary region data identified by zeroth through (R−1)-th region numbers and an R-th region number, where R represents a predetermined integer, a sum of said predetermined integer plus one being approximately equal to N when N is greater than or equal to 3, and is equal to N when N is equal to 2;

said N secondary phase data comprising (R+1) secondary region data identified by said zeroth through said R-th region numbers.

3. A device as claimed in claim 2, said primary region data comprising zeroth through (R−1)-th and an R-th primary region data, said secondary region data comprising zeroth through (R−1)-th and an R-th secondary region data, wherein each of said zeroth through said (R−1)-th primary and secondary region data includes a synchronization code preceding an r-th region number, where r is variable between zero and said predetermined integer less one, both inclusive, each of said R-th primary and secondary region data identifying said R-th region number alone.

4. A device as claimed in claim 2, wherein:

said first phase data producing means comprises:
a first servo head unit coupled to said first disk for producing a master index pulse during one rotation of said first disk; and
a first phase data producing circuit responsive to said master index pulse for producing said (R+1) primary region data;

said second phase data producing means comprising:
a second servo head unit coupled to said second disk for producing a slave index pulse during one rotation of said second disk; and
a second phase data producing circuit responsive to said slave index pulse for producing said (R+1) secondary region data.

5. A device as claimed in claim 4, further comprising a clock generator for generating a clock signal comprising a number of clock pulses between each pair of two consecutive master index pulses produced by said first servo head unit and between each pair of two consecutive slave index pulses produced by said second servo head unit, wherein:

said first phase data producing circuit comprises:
a first frequency divider reset by each of said master index pulses for frequency dividing said clock signal by a predetermined frequency division factor to produce primary frequency divided pulses;

a first primary counter reset by each of said master index pulses for counting a first primary count by counting said primary frequency divided pulses repeatedly from a first primary predetermined count to a second primary predetermined count to produce a first primary count signal representative of said first primary count and to produce a primary count pulse when said first primary count is counted to said first primary predetermined count immediately after counted to said second primary predetermined count, said first primary counter being suspended by a first suspension signal to keep the first primary predetermined count to which said first primary count is counted immediately after counted to said second primary predetermined count;

a second primary counter reset by each of said master index pulses for counting a second primary count by counting the primary count pulses produced by said first primary counter repeatedly from a first secondary predetermined count to a second secondary predetermined count to produce a second primary count signal representative of said second primary count, said first and said second secondary predetermined counts being different by (R+1), said second primary counter producing said first suspension signal between a first and a second primary time instant, said first primary time instant being a time instant at which said second primary count is counted from said second primary predetermined count less one to said second primary predetermined count, said second primary time instant being another time instant at which said second primary counter is reset; and a first phase data producing gate supplied with said first and said second primary count signals for producing said zeroth through said (R−1)-th region numbers in accordance with the second primary count counted by said second primary counter, said zeroth region number being produced when said first primary count is counted to a preselected count which is at least (R+1) less than said first primary predetermined count;

said second phase data producing circuit comprising:
a second frequency divider reset by each of said slave index pulses for frequency dividing said clock signal by said predetermined frequency division factor to produce secondary frequency divided pulses;

a first secondary counter reset by each of said slave index pulses for counting a first secondary count by counting said secondary frequency divided pulses repeatedly from said first primary predetermined count to said second primary predetermined count to produce a first secondary count signal representative of said first secondary count and to produce a secondary count pulse when said first secondary count is counted to said first primary predetermined count immediately after counted to said second primary predetermined count, said first secondary counter being suspended by a second suspension signal to keep the first primary predetermined count to which said first secondary count is counted immediately after counted to said second primary predetermined count;

a second secondary counter reset by each of said slave index pulses for counting a second secondary count by counting the secondary count pulses produced by said first secondary counter repeatedly from said first secondary predetermined count to said second secondary predetermined count to produce a second secondary count signal representative of said second secondary count and to produce said second suspension signal between a first and a second secondary time instant, said first secondary time instant being a time instant at which said second secondary count is counted from said second primary predetermined count less one to said second secondary predetermined count, said second secondary time instant being another time instant at which said second secondary counter is reset; and a second phase data producing gate supplied with said first and said second secondary count signals for producing said zeroth through said (R−1)-th region numbers in accordance with the second secondary count counted by said second secondary counter, said zeroth region number being produced when said first secondary count is counted to said preselected count.

6. A device as claimed in claim 2, wherein a p-th primary region datum is identified by a p-th master region number, where p is variable between zero and said predetermined integer less one, a q-th secondary region datum is identified by a q-th slave region number, where q is variable between zero and said predetermined integer less one, and wherein said comparing means comprises:

a first part for producing said p-th master and said q-th slave region numbers from said p-th primary and said q-th secondary region datum and a master and a slave output pulse immediately before said p-th master and said q-th slave region number are produced; and a second part for comparing said p-th primary and said q-th secondary region data to judge from said p-th master and said q-th slave region numbers and said master and said slave output pulses whether said second phase leads, lags behind, or is in synchronism with said first phase, said second part producing said control signal to make said control means accelerate, decelerate, and keep constant a speed of rotation of said second disk when said second phase lags behind, leads, and is in synchronism respectively with said first phase.

7. A device as claimed in claim 6, each of said zeroth through (R−1)-th primary and secondary region data having a predetermined region duration, wherein said second part comprises:

an arithmetic unit for subtracting said p-th master region number from said q-th slave region number to produce a difference between said p-th master and said q-th slave region numbers and for judging whether or not said difference is equal to a predetermined value and whether said difference is not less than said predetermined value or not greater than said predetermined value, said arithmetic unit producing an output datum representative of two and a sum of an absolute value of said difference plus one when said difference is equal to said predetermined value and is not, said arithmetic unit producing a not-less and a not-greater signal when said difference is not less than and is not greater than said predetermined value;

a first logic circuit for producing a decrement pulse either when said master output pulse is produced while said not-less signal is produced or when said slave output pulse is produced while said not-greater signal is produced, said first logic circuit producing said decrement pulse twice when said phase difference is less than said region duration and consequently when said master and said slave output pulses are produced while said not-less and said not-greater signals are produced;

a counter for subtracting one from said output datum in response to said decrement pulse to produce a zero representing pulse when said output datum is reduced to zero;

a second logic circuit for producing a first and a second set pulse when said slave output pulse is produced while said not-less signal is produced and when said master output pulse is produced while said not-greater signal is produced;

an accelerating flip-flop set by said first set pulse and reset by said zero representing pulse to produce said control signal and to use said control signal in making said control means accelerate said speed of rotation while set;

a decelerating flip-flop set by said second set pulse and reset by said zero representing pulse to produce said control signal and to use said control signal in making said control means decelerate said speed of rotation while set; and an additional logic circuit for producing an additional pulse when said phase difference is equal to zero and consequently when said master and said slave output pulses are simultaneously produced while said not-less and said not-greater signals are both produced, said additional pulse inhibiting said accelerating and said decelerating flip-flops from being set by said first and said second set pulses so that said speed of rotation is kept constant.

8. A device as claimed in claim 1, wherein:

said first phase data producing means comprises:
  a first servo head unit coupled to said first disk for producing a master index pulse during one rotation of said first disk; and
  a first phase data producing circuit responsive to said master index pulse for producing said primary phase data;

said second phase data producing means comprising:
  a second servo head unit coupled to said second disk for producing a slave servo pulse during one rotation of said second disk; and
  a second phase data producing circuit responsive to said slave servo pulse for producing said secondary phase data.

9. A device as claimed in claim 8, each of an r-th master and an r-th slave phase datum being specified by an r-th information datum, where r is variable between zero and said predetermined integer less one, both inclusive, wherein said comparing means comprises zeroth through S-th region comparators, where S represents a preselected integer which is not greater than said predetermined integer, zero through said preselected integer being selected from zero through said predetermined integer, an s-th region comparator comprising, where s is variable between zero and said preselected integer, both inclusive:

an s-th region data memory preliminarily loaded with an s-th information datum;
  an s-th master region detector for referring to said s-th information datum to detect an s-th master phase datum in said zeroth through said R-th master phase data and to produce an s-th master detection pulse when said s-th master phase datum is detected;
  an s-th slave region detector for referring to said s-th information datum to detect an s-th slave phase datum in said zeroth through said R-th slave phase data and to produce an s-th slave detection pulse when said s-th slave phase datum is detected;
  an s-th deceleration suspend signal producing circuit responsive to said s-th slave detection pulse for producing an s-th deceleration suspend signal during at least a half rotation of said second disk from production of said s-th slave detection pulse;
  an s-th acceleration suspend signal producing circuit responsive to said s-th master detection pulse for producing an s-th acceleration suspend signal during at least a half rotation of said second disk from production of said s-th master detection pulse; and
  an s-th deceleration and an s-th acceleration circuit which are exclusively operable, said s-th deceleration circuit being responsive to said s-th master and slave detection pulses and said s-th deceleration suspend signal to produce an s-th deceleration signal when said s-th slave phase datum leads said s-th master phase datum, said s-th acceleration circuit being responsive to said s-th master and slave detection pulses and said s-th acceleration suspend signal to produce an s-th acceleration signal when said s-th slave phase datum lags behind said s-th master phase datum.

10. A device as claimed in claim 9, wherein:

said s-th deceleration circuit comprises:
  an s-th deceleration inverter for inverting said s-th slave detection pulse into an s-th slave inverted pulse;
  an s-th deceleration three-input AND gate supplied with said s-th master detection pulse, said s-th slave inverted pulse, and said s-th deceleration suspend signal to produce an s-th primary deceleration AND output signal;
  an s-th deceleration two-input AND gate supplied with said s-th slave inverted pulse and an s-th deceleration input signal to produce an s-th secondary deceleration AND output signal;
  an s-th deceleration OR gate supplied with said s-th primary and secondary deceleration AND output signals to produce an s-th deceleration OR output signal;
  an s-th deceleration flip-flop responsive to said s-th deceleration OR output signal for producing said s-th deceleration signal; and
  s-th deceleration signal supply means for supplying said s-th deceleration signal to said s-th deceleration two-input AND gate as said s-th deceleration input signal;

said s-th acceleration circuit comprising:
  an s-th acceleration inverter for inverting said s-th master detection pulse into an s-th master inverted pulse;
  an s-th acceleration three-input AND gate supplied with said s-th slave detection pulse, said s-th master inverted pulse, and said s-th acceleration suspend signal to produce an s-th primary acceleration AND output signal;
  an s-th acceleration two-input AND gate supplied with said s-th master inverted pulse and an s-th acceleration input signal to produce an s-th secondary acceleration AND output signal;
  an s-th acceleration OR gate supplied with said s-th primary and secondary acceleration AND output signals to produce an s-th acceleration OR output signal;

an s-th acceleration flip-flop responsive to said s-th acceleration OR output signal for producing said s-th acceleration signal; and s-th acceleration signal supply means for supplying said s-th acceleration signal to said s-th acceleration two-input and gate as said s-th acceleration input signal.

11. A device as claimed in claim 10, further comprising a delay circuit between said second servo head unit and said second phase data producing circuit.

12. A device as claimed in claim 8, further comprising a delay circuit between said second servo head unit and said second phase data producing circuit.

* * * * *

UNITED STATES PATENT AND TRADEMARK OFFICE
CERTIFICATE OF CORRECTION

PATENT NO. : 5,650,885
DATED : July 22, 1997
INVENTOR(S) : Yoshiji Kitamura, et. al.

It is certified that error appears in the above-identified patent and that said Letters Patent is hereby corrected as shown below:

Title page, item [30],
In the Foreign Application Priority Data section, delete

"Nov. 13, 1994 [JP] Japan ......... 6-325367"

and insert

--Nov. 13, 1991 [JP] Japan ......... 3-325637--.

Signed and Sealed this

Tenth Day of March, 1998

Attest:

BRUCE LEHMAN

*Attesting Officer*  *Commissioner of Patents and Trademarks*